(12) United States Patent
Ohira et al.

(10) Patent No.: US 9,323,003 B2
(45) Date of Patent: Apr. 26, 2016

(54) OPTICAL DEVICE AND MANUFACTURING METHOD THEREOF

(71) Applicant: Kabushiki Kaisha Toshiba, Minato-ku (JP)

(72) Inventors: Kazuya Ohira, Tokyo (JP); Mizunori Ezaki, Kanagawa (JP); Nobuo Suzuki, Kanagawa (JP); Norio Iizuka, Kanagawa (JP); Haruhiko Yoshida, Chiba (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 160 days.

(21) Appl. No.: 14/165,994

(22) Filed: Jan. 28, 2014

(65) Prior Publication Data
US 2014/0212088 A1 Jul. 31, 2014

(30) Foreign Application Priority Data
Jan. 30, 2013 (JP) .................................. 2013-016020

(51) Int. Cl.
| | | |
|---|---|---|
| *G02B 6/28* | (2006.01) | |
| *G02B 6/293* | (2006.01) | |
| *H04B 10/80* | (2013.01) | |
| *B29D 11/00* | (2006.01) | |
| *G02F 1/295* | (2006.01) | |
| *G02F 1/29* | (2006.01) | |

(52) U.S. Cl.
CPC .......... *G02B 6/29344* (2013.01); *G02B 6/2813* (2013.01); *B29D 11/00701* (2013.01); *G02F 1/2955* (2013.01); *G02F 2001/291* (2013.01); *G02F 2202/104* (2013.01); *H04B 10/803* (2013.01)

(58) Field of Classification Search
CPC ......................... G02B 6/2813; G02B 6/29344
See application file for complete search history.

(56) References Cited

U.S. PATENT DOCUMENTS

| 5,082,342 A | 1/1992 | Wight et al. |
| 2008/0131141 A1* | 6/2008 | Ranganath ......... H04B 10/5053 398/183 |

FOREIGN PATENT DOCUMENTS

| JP | 10-62825 | 3/1998 |
| JP | 2009-48021 | 3/2009 |
| WO | WO 89/04988 | 6/1989 |

OTHER PUBLICATIONS

Chris J. Brooks et al. "Vertically-integrated multimode interferometer coupler for 3D photonic circuits in SOI", Optics Express, vol. 19, No. 4, 2011, 6 pages

* cited by examiner

*Primary Examiner* — Jerry Rahll
(74) *Attorney, Agent, or Firm* — Oblon, McClelland, Maier & Neustadt, L.L.P.

(57) ABSTRACT

An optical device according to an embodiment includes a laser light source, a first optical waveguide that propagates light being output from the laser light source, a first distribution device that distribute the light into n lights, n second optical waveguides that propagates the n lights being output from the first distribution device, n second distribution devices that distribute each of the n lights into m lights, n×m third optical waveguides arranged in a matrix form and propagates the n×m lights being output from the m second distribution devices, a control electrode that apply a voltage or current to each of the third optical waveguides, and control phase of the light propagating through the third optical waveguides, and an output end surface that output the n×m lights.

6 Claims, 28 Drawing Sheets

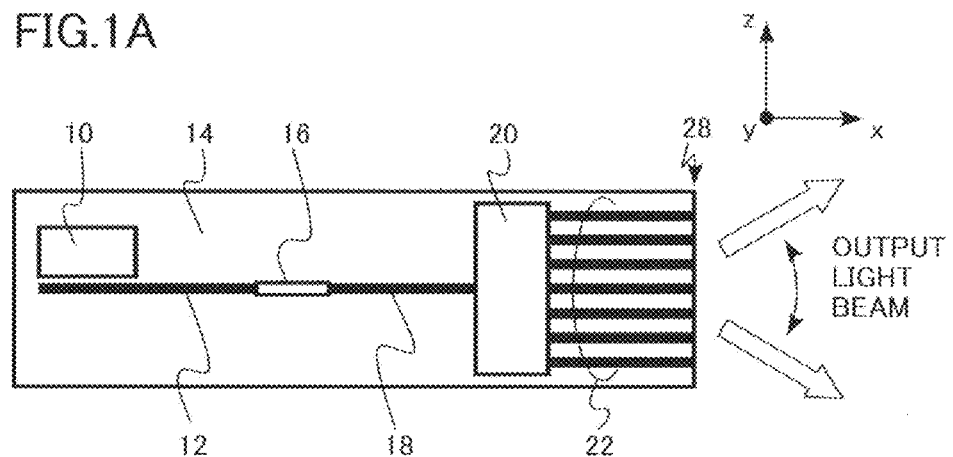
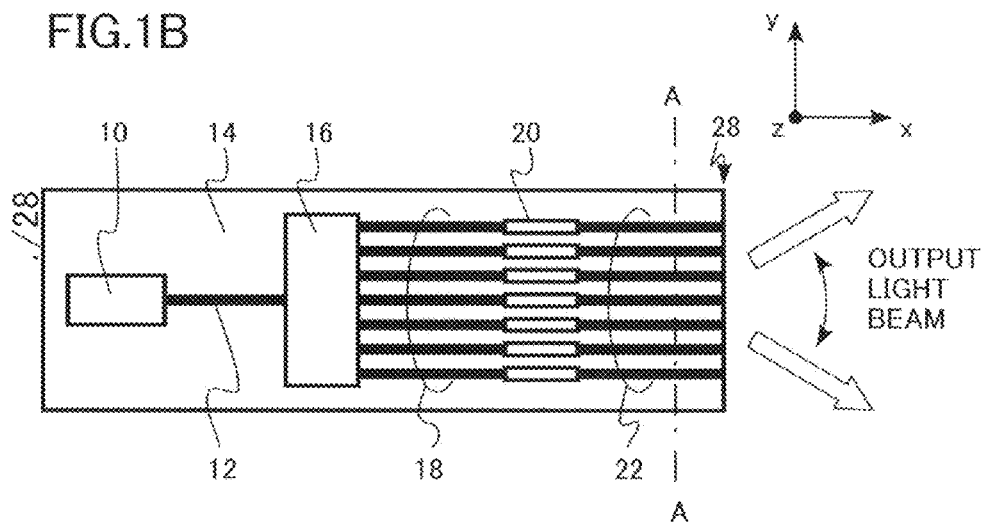
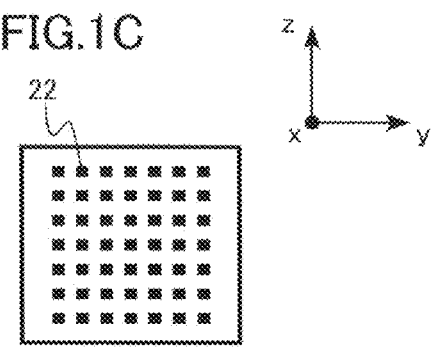

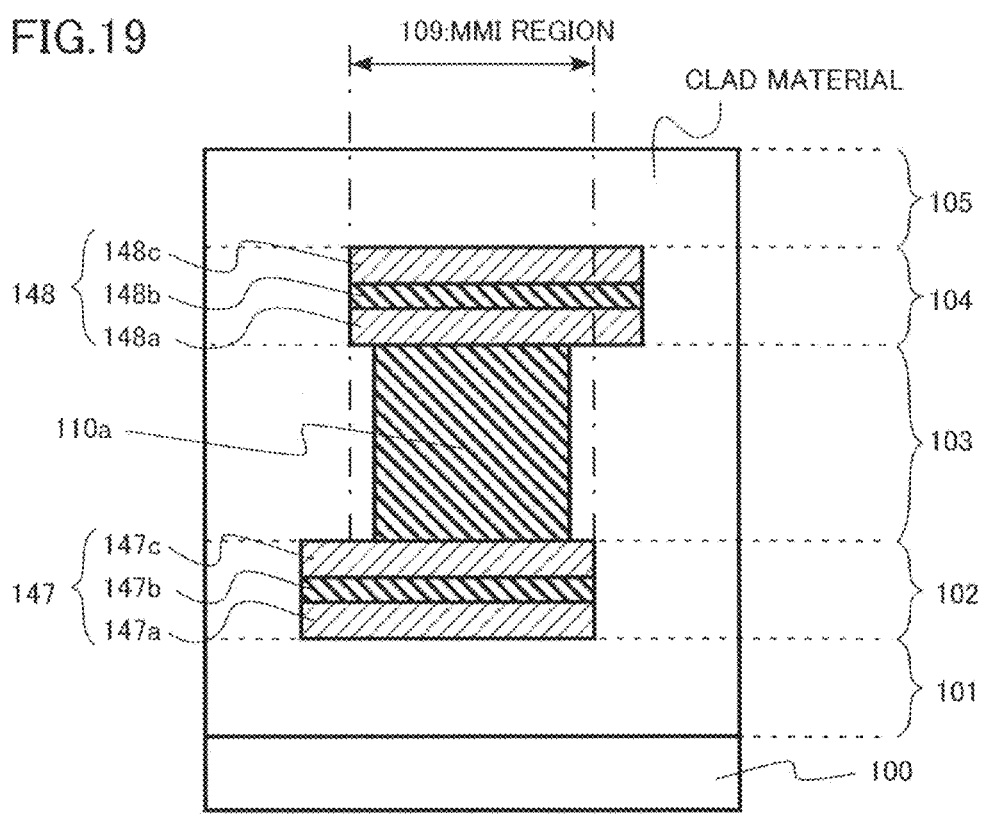

Type=A : L=1.35 μm

Type=A : L=6.2 μm

Type=A : L=9.15 μm

Type=B : L=9.15 μm

NO OFFSET

OFFSET 25nm

FIG.40A
FIG.40B
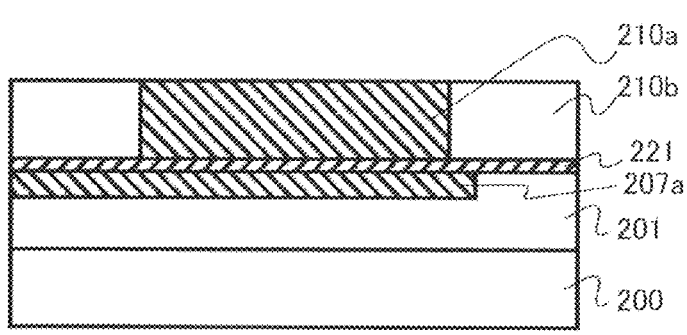
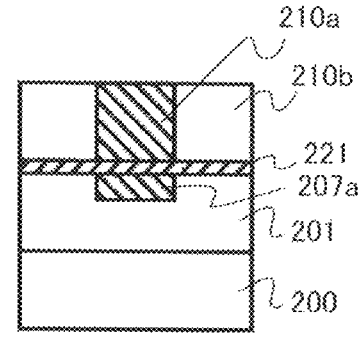

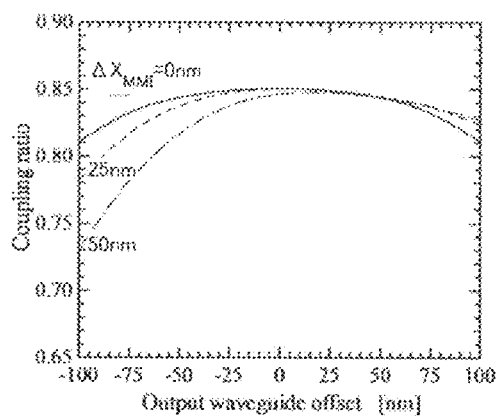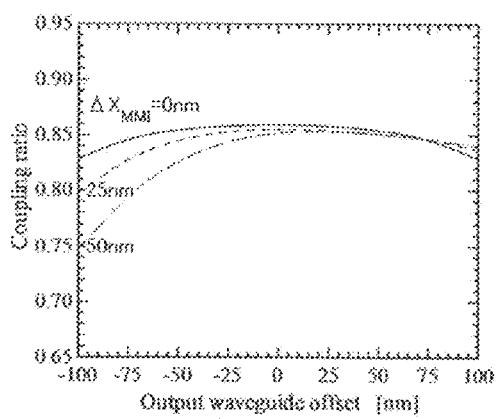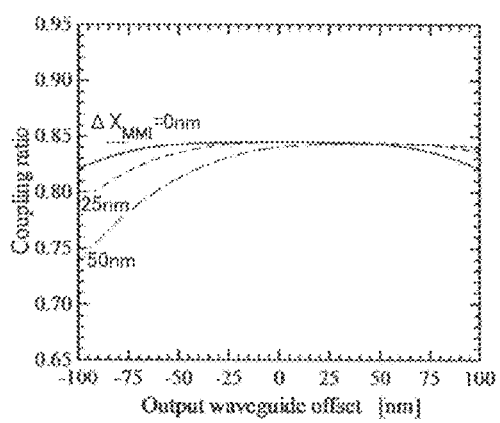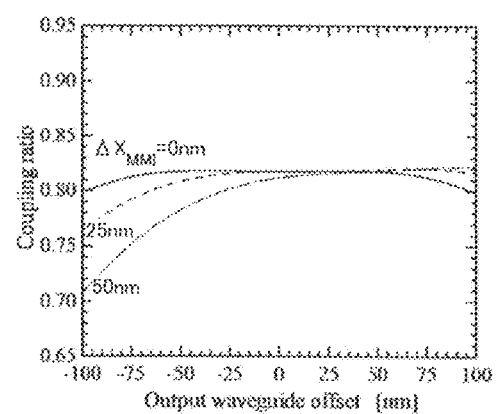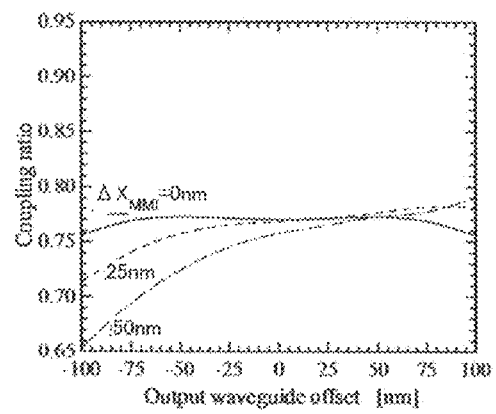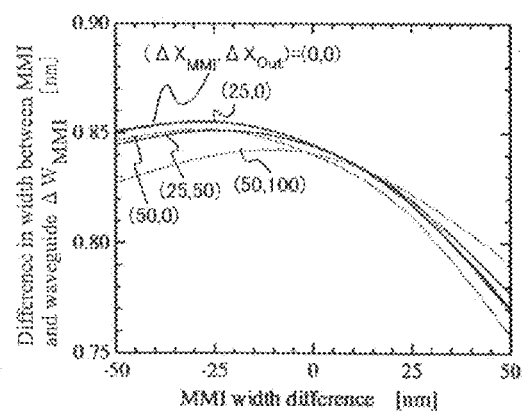

OPTICAL DEVICE AND MANUFACTURING METHOD THEREOF

CROSS-REFERENCE TO RELATED APPLICATION

This application is based upon and claims the benefit of priority from Japanese Patent Application No. 2013-016020, filed on Jan. 30, 2013, the entire contents of which are incorporated herein by reference.

FIELD

Embodiments described herein relate generally to an optical device and a manufacturing method thereof.

BACKGROUND

In recent years, the data capacity of images and motion pictures processed by portable terminals are increasing drastically. For this reason, data transmission speed between data holding devices such as a portable device and a PC becomes bottlenecks.

A technique for solving such problem of data transmission speed between devices includes an optical transmission technique for replacing an electric signal with an optical signal. Such optical transmission technique includes a type using an optical transmission path such as an optical fiber and a type for transmitting light in the space.

The optical fiber transmission is generally used for long distance transmission, but in order to connect devices, it is necessary to improve the precision of constituent components so as to improve alignment precision of connection units. Therefore, there is a defect of high cost and fragileness.

On the other hand, the space transmission does not require none of such constituent components, and can simplify the transmission/reception unit. However, it is necessary to receive transmission light by reducing the loss as much as possible. With regard to this point, it is an object to improve the alignment precision like the optical fiber transmission.

One of the solutions includes making one or both of the transmission/reception into an array. This would improve the tolerance of alignment deviation, but there is a problem in that the size of the constituent component increases. There is a technique called beam steering for changing the direction of the optical output, but there is a problem in that the size of the devices that have been suggested until today are extremely large.

On the other hand, there is a technique that uses semiconductor manufacturing process to form an optical transmission path. In this technique, by using silicon (Si) photonic wire waveguide in which the contrast of the refractive index between the core and the surrounding portion is high, the size of the optical device can be reduced. Typical cross sectional size of the Si photonic wire waveguide of wavelength 1.55 μm band is 220 nm×450 nm. Due to strong optical confinement effect based on high refractive index difference, even a bent waveguide of which curvature radius is small can achieve a low level of radiation loss. When highly developed CMOS process technique is applied, optical integrated circuits obtained by integrating many microscopic optical/electronic devices can be mass produced. Therefore, this is expected to be applied to not only optical inter connection between equipments and between boards but also high capacity optical wiring between chips and in a chip.

In particular, in an intrachip optical wiring in which wiring length is several centimeters or less, a simple optical parallel wiring, that is, Space Division Multiplexing (SDM), is more advantageous in terms of smaller overhead, cost, power consumption, and the like, rather than using Wavelength Division Multiplexing (WDM) requiring strict wavelength management or Time Division Multiplexing (TDM) requiring optical transmission/reception circuits and SerDes of several dozen Gbps. In the SDM, the number of wirings increases, but if necessary, by increasing the wiring layers, the density of wirings per area can be increased. In any case, when multiple points in a chip are connected with optical wiring, at least two layers of optical wiring layers are required to cross the waveguides.

It is not practical to achieve multilayer optical wirings by pasting expensive silicon-on-insulator (SOI) substrates, and therefore, multiple optical wiring layers are preferably fabricated using backend process of CMOS just like electric wiring layers. A photonic wire waveguide formed using hydrogen-terminated amorphous silicon (a-Si:H) deposited by plasma CVD at a low temperature of about 300 degrees Celsius on $SiO_2$ has already realized low loss optical propagation property that is as good as a photonic wire waveguide formed with the top crystal Si layer of a SOI substrate.

Examples of optical couplers optically connecting optical wiring layers of multilayer optical wirings include a pair of inversely taper waveguides, a directional coupler, and a multimode interference (MMI) optical coupler.

The optical coupler using the taper waveguide include an incidence side waveguide configured to be narrower in a tapered manner and an output side waveguide configured to be wider in a tapered manner, which are arranged in proximity to each other so as to overlap in the vertical direction. The coupling efficiency can be maintained at a high level even if there is some deviation in the position, but in order to change the wave guiding mode in a continuous manner, a long taper is required, which makes it difficult to reduce the size.

The coupling length of the vertical directional coupler can be somewhat reduced when the wiring layer spacing is narrowed, but in this case, tolerance is also reduced, and therefore, even a small deviation in the position or asymmetry (difference in the width, thickness, refractive index, and the like) between the two optical waveguides deteriorates the coupling characteristics seriously.

The tolerance of the MMI optical coupler is relatively high even if the size thereof is reduced, and therefore, it is generally used as an optical coupler within a plane using the Si photonic wire waveguide. A vertical MMI optical coupler used for connecting wiring layers has been suggested, but a specific method for making a three-dimensional structure including upper/lower input/output waveguides has not yet been disclosed. In particular, in an on-chip optical wiring, it is desired to develop a technique for fabricating a small vertical MMI with a width of sub-micron and with a length of about 10 μm with a high degree of precision, using a-Si material. Even if a high precision stepper is used, the alignment accuracy is about ±20 nm, and therefore, it is desired to make a structure that can suppress excessive loss as much as possible even with this level of offset.

BRIEF DESCRIPTION OF THE DRAWINGS

FIGS. 1A to 1C are schematic diagrams illustrating an optical device according to a first embodiment;

FIG. 19 is a schematic view illustrating an optical device according to a modification of the third embodiment;

FIGS. 40A and 40B are figures schematically explaining a second manufacturing method of the fourth embodiment;

FIGS. 41A to 41F are figures illustrating calculation result of layer offset dependency of coupling efficiency of an optical coupler according to the fourth embodiment and a modification.

DETAILED DESCRIPTION

Figure 2:
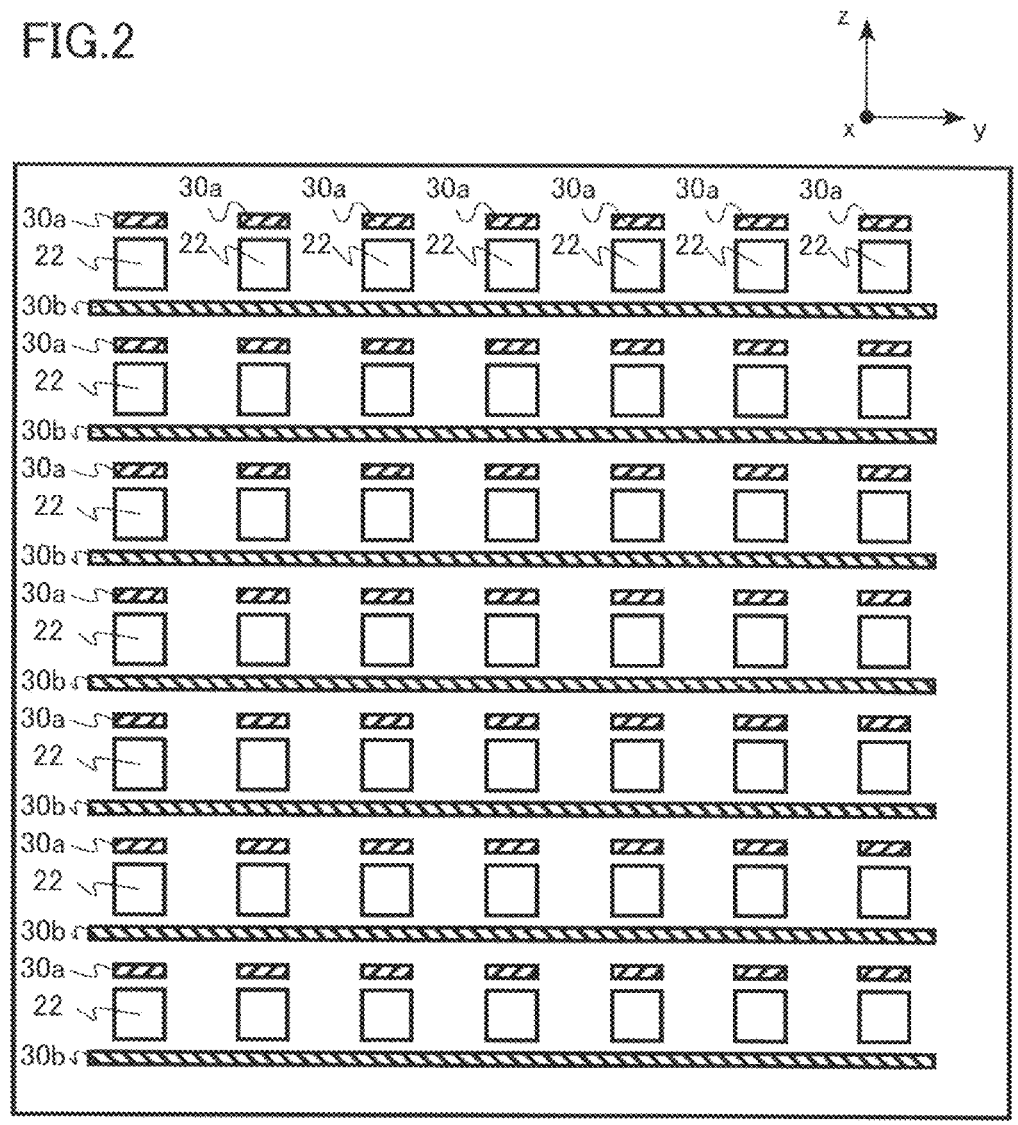
FIG. 2 is an enlarged cross sectional view taken along A-A of FIG. 1B.

An optical device of an embodiment includes a laser light source, a first optical waveguide configured to propagate light which is output from the laser light source, a first distribution device configured to distribute the light, which is input from the first optical waveguide, into n lights (n is an integer equal to or more than two), n second optical waveguides configured to propagate the n lights which are output from the first distribution device, n second distribution devices configured to distribute the lights, which propagate through the second optical waveguides, into m lights (m is an integer equal to or more than two), n×m third optical waveguides configured to propagate the n×m lights which are output from the m second distribution devices, a plurality of control electrodes configured to apply a voltage or current to each of the third optical waveguides, and control the phase of the light propagating through the third optical waveguide, and an output end surface configured to output the light of which phase is controlled by the control electrode.

Hereinafter, embodiments of the present disclosure will be described with reference to the drawings. For example, the ratio of the vertical and horizontal sizes and the dimensions in the drawings may be drawn in a manner different from the actual ratio of the vertical and horizontal sizes and dimensions for the sake of convenience.

First Embodiment

An optical device according to the present embodiment includes a laser light source, a first optical waveguide configured to propagate light which is output from the laser light source, a first distribution device configured to distribute the light, which is input from the first optical waveguide, into n lights (n is an integer equal to or more than two), n second optical waveguides configured to propagate the n lights which are output from the first distribution device, n second distribution devices configured to distribute the lights, which propagate through the second optical waveguides, into m lights (m is an integer equal to or more than two), n×m third optical waveguides arranged in a matrix form configured to propagate the n×m lights which are output from the m second distribution devices, a plurality of control electrodes configured to apply a voltage or current to each of the third optical waveguides, and control the phase of the light propagating through the third optical waveguide, and an output end surface configured to output the light of which phase is controlled by the control electrode.

According to the present embodiment, with the above configuration, a small and highly efficient optical device having a mechanism for controlling output direction of an output light beam in a three dimensional manner can be achieved.

FIGS. 1A to 1C are schematic diagrams illustrating an optical device according to the present embodiment. FIG. 1A is an xz cross sectional view, FIG. 1B is an xy cross sectional view, and FIG. 1C is a drawing of an output end surface.

An optical device according to the present embodiment includes a laser light source 10. The laser light source 10 is, for example, a Fabry-Perot Laser Diode, a DFB laser diode, and a DBR laser diode having a structure obtained by laminating compound semiconductors, or a ring-type or a disk-type micro laser diode. The micro laser diode has, for example, a diameter of about 10 μm to 200 μm.

A first optical waveguide 12 is provided, which is optically coupled with the laser light source 10, and propagates light which is output from the laser light source 10. The first optical waveguide 12 is formed with, for example, polycrystalline, single crystal, or amorphous silicon (Si). The width of the first optical waveguide 12 is, for example, about 100 nm to 1000 nm.

The circumference of the first optical waveguide 12 is a clad layer 14 of which refractive index is less than that of the first optical waveguide 12. The clad layer 14 is, for example, silicon oxide film ($SiO_2$). The clad layer 14 also exists between the laser light source 10 and the first optical waveguide 12.

A first distribution device 16 is provided, which distributes the light received from the first optical waveguide 12 into n lights (n is an integer equal to or more than two). In FIGS. 1A and 1B, n is 7, but n is not limited to this number. The first distribution device 16 is, for example, multi-mode interference waveguide (MMI).

The first distribution device 16 has, for example, a rectangular solid shape of which y direction is the longest side. The first distribution device 16 is formed with, for example, polycrystalline or single crystal silicon (Si). The length of the longest side is, for example, about 5 μm to 50 μm. In the manufacturing process of the optical device, the first optical waveguide 12 and the first distribution device 16 can be simultaneously formed by patterning the same material.

N second optical waveguides 18 are provided, which propagate the n lights which are output from the first distribution device 16. The second optical waveguides 18 are arranged in parallel to each other and with the same length within the xy plane. The width of the second optical waveguides 18 is, for example, about 100 nm to 1000 nm.

The second optical waveguide 18 is formed with, for example, polycrystalline or single crystal silicon (Si). The circumference of the second optical waveguides 18 is a clad layer 14 of which refractive index is less than that of the second optical waveguides 16.

N second distribution devices 20 are provided, which distribute the light propagated to each of the second optical waveguides 18 into m lights (m is an integer equal to or more than two). In FIGS. 1A and 1B, m is 7, but m is not limited to this number. The second distribution device 20 is, for example, a multi-mode interference waveguide (MMI).

The second distribution device 20 has, for example, a rectangular solid shape of which z direction is the longest side. The second distribution device 20 is formed with, for example, polycrystalline or single crystal silicon (Si). The second distribution devices 20 are arranged in parallel to each other in y direction. The length of the longest side is, for example, about 5 μm to 50 μm.

N×m third optical waveguides 22 are provided, in which are arranged in a matrix form and propagate the n×m lights which are output from the n second distribution devices 20. In FIGS. 1A to 1C, n×m is 7×7, but the numbers are not limited thereto.

N third optical waveguides 22 thereof are arranged in parallel to each other and with the same length within the xy plane. M third optical waveguides 22 thereof are arranged in parallel to each other and with the same length within the xz plane. All of the third optical waveguides 22 have the same length. The width of the third optical waveguide 22 is, for example, about 100 nm to 1000 nm.

The third optical waveguide 22 is formed with, for example, polycrystalline or single crystal silicon (Si). The circumference of the third optical waveguide 22 is a clad layer 14 of which refractive index is less than that of the third optical waveguide 22.

As illustrated in FIG. 1C, the third optical waveguide 22 extends to the output end surface 28 of the optical device. The light is output from the output end surface 28. More specifically, the output light beam is output from the output end surface 28.

FIG. 2 is an enlarged cross sectional view taken along A-A of FIG. 1B. The optical device according to the present embodiment includes a control electrode for applying voltage or current to each third optical waveguide 22 and controlling the phases of lights propagating through the third optical waveguides 22.

In FIG. 2, the control electrode is constituted by an upper electrode 30a and a lower electrode 30b. One upper electrode 30a is provided for one third optical waveguide 22. One lower electrode 30b is provided, as a common electrode, for n third optical waveguides 22 existing in the same xy plane. The upper electrode 30a and the lower electrode 30b are, for example, metal electrodes.

The upper electrode 30a and the lower electrode 30b are used to apply voltage or current to each third optical waveguide 22, and the control electrode controls the phases of lights propagating through the third optical waveguides 22. The lights of which phases are controlled by the upper electrode 30a and the lower electrode 30b are output from the output end surface.

When the voltage or current is applied to the third optical waveguides 22, the refractive indexes of the third optical waveguides 22 are changed. Due to this change of the refractive indexes, the phases of the lights propagating through the third optical waveguides 22 are changed.

When the voltage or current is applied to each of the third optical waveguides 22, the phase of the light can be controlled for each of the n×m third optical waveguides 22. Accordingly, the output direction of the output light beam which is output from the output end surface 28 (white arrows in FIGS. 1A and 1B) can be controlled in a three-dimensional manner. More specifically, the light beam can be output with an angle in the z direction with respect to the x direction, or can be output with an angle in the y direction with respect to the x direction.

The control of the refractive index of the third optical waveguide 22 is done using, for example, carrier injection, depletion or electro-optic effect based on bias application.

For example, a pn-junction is formed in the third optical waveguide 22, and the upper electrode 30a and the lower electrode 30b are brought into contact with the third optical waveguide 22. Accordingly, when forward bias is applied, the refractive index is reduced by carrier injection. When reverse bias is applied, the refractive index is increased by depletion.

For example, an insulating layer is provided at least between the upper electrode 30a and the third optical waveguide 22, so that Metal Insulator Semiconductor (MIS) structure is formed. By controlling the voltage of the upper electrode 30a, accumulation and depletion of carriers are controlled in the third optical waveguide 22.

For example, a structure is formed in which an insulating layer is provided at least between the third optical waveguide 22 and both of the upper electrode 30a and the lower electrode 30b. By controlling the voltage applied between the upper electrode 30a and the lower electrode 30b, the refractive index of each third optical waveguide 22 is controlled by electro-optic effect generated in the third optical waveguide 22.

Figure 3:
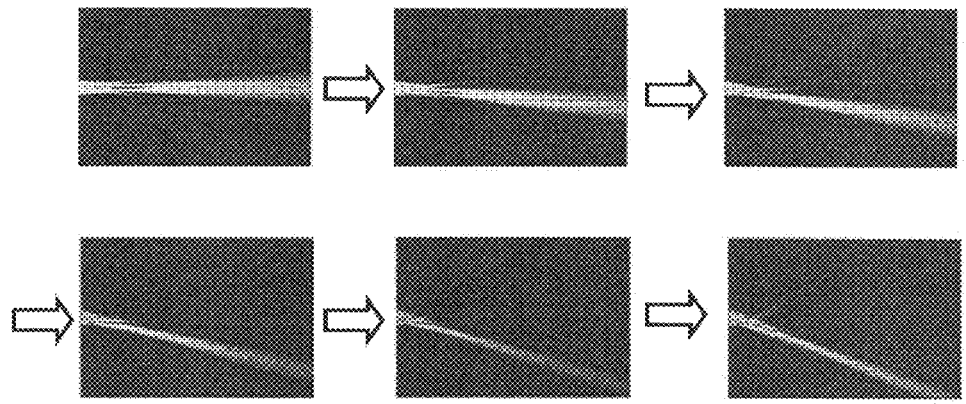
FIG. 3 is a figure illustrating a simulation result of direction control of an output light beam according to the first embodiment.

FIG. 3 is a figure illustrating a simulation result of direction control of an output light beam according to the present embodiment. As illustrated in FIG. 3, it is understood that, by performing appropriate phase control, the direction of the output light beam which is emitted from the output end surface can be controlled. In this simulation, it is found that the direction can be changed up to 14 degrees at one side.

The voltage or current applied to each upper electrode 30a and each lower electrode 30b is controlled by a phase control circuit, not shown.

According to the present embodiment, the matrix three-dimensional optical waveguide structure capable of individually controlling the refractive indexes is provided, whereby the output direction of the output light beam can be controlled in a three-dimensional manner. When the direction control unit of the output light beam and the laser light source are integrated, the size can be reduced, and the loss of light at the connection unit between each portion can also be suppressed. Therefore, the small and highly efficient optical device having a mechanism for controlling output direction of an output light beam in a three dimensional manner can be achieved.

In this explanation, the first, second, and third optical waveguides 12, 18, 22 are silicon, but the first, second, and third optical waveguides 12, 18, 22 may be, for example, silicon nitride, oxynitride silicon, silicon carbide, silicon oxide, or III-V semiconductor and the like.

The third optical waveguide 22 may be made by, for example, bonding a material significantly achieving electro-optic effect, for example, lithium niobate ($LiNbO_3$) and the like on waveguide made of silicon and the like.

The control electrode may be such that, without providing the common electrode, two electrodes may be independently provided for each of the third optical waveguides 22. Alternatively, the electrodes may not be provided at the upper and lower sides of the third optical waveguide 22, and may be provided at the right and left sides of the third optical waveguide 22.

Preferably, the optical device according to the present embodiment may further include an optical reception unit detecting unit. The optical reception unit detecting unit has a function of detecting the position of the reception unit of the output light beam which is output from the optical device. The position information about the optical reception unit obtained is transferred to, for example, the phase control circuit, and the phase control circuit controls the output light beam so that it faces the reception unit accurately.

The optical reception unit detecting unit is an image-capturing device for recognizing the position of the reception unit through image recognition, for example. Alternatively, for example, it is an antenna device for detecting the direction of radio wave oscillated by the optical reception unit.

As described above, the optical reception unit detecting unit is provided, so that the output light beam can be emitted toward the reception unit automatically with a high degree of precision.

Second Embodiment

An optical device according to the present embodiment further includes a phase control circuit for controlling the voltage or current applied to the control electrode. The phase control circuit is formed on an integrated circuit on a semiconductor substrate, and a laser light source, first, second, and third optical waveguides, first and second distribution devices, a control electrode, and an output end surface are formed on the semiconductor substrate.

In the optical device according to the present embodiment, the configuration of the laser light source, the first, second, and third optical waveguides, the first and second distribution devices, the control electrode, the output end surface, and the like is the same as that of the optical device according to the first embodiment. Accordingly, descriptions about the same contents as those of the optical device according to the first embodiment are omitted.

Figure 4:
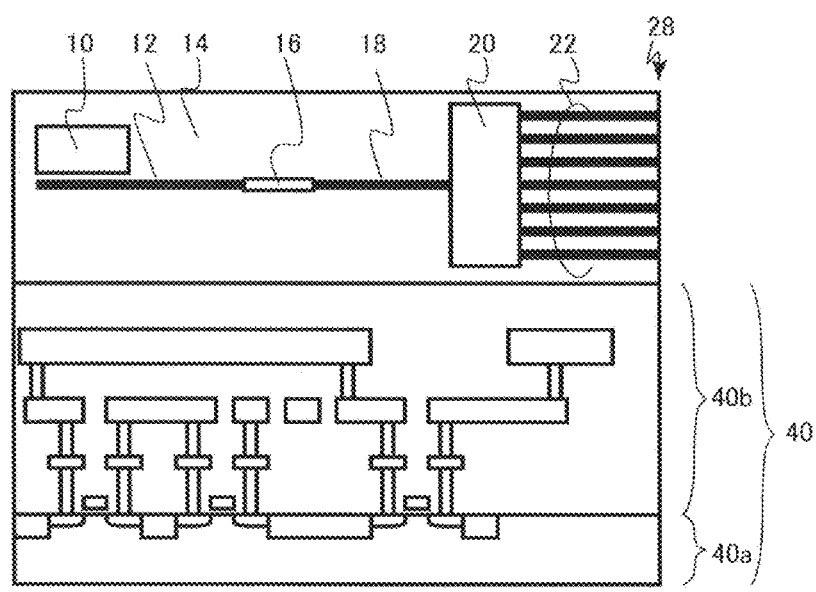
FIG. 4 is a schematic cross sectional view illustrating an optical device according to a second embodiment.

FIG. 4 is a schematic cross sectional view illustrating an optical device according to the present embodiment. The optical device according to the present embodiment includes a control circuit 40. The control circuit 40 includes a phase control circuit. The control circuit 40 is formed with an integrated circuit on the semiconductor substrate. More specifically, the control circuit 40 includes, for example, a device region 40a including a device such as a transistor and a diode and a multiple layer wiring region 40b connecting each device.

The laser light source 10, the first, second, and third optical waveguides 12, 18, 22, the first and second distribution devices 16, 20, the control electrode, the output end surface 28, and the like are formed on the control circuit 40.

The control circuit 40 controls ON/OFF and the output power of the laser light source 10, for example. For example, the phase control circuit in the control circuit 40 sets a voltage value or a current value appropriate for each of n×m third optical waveguides 22, and applies it to the control electrode provided in each of the third optical waveguides 22.

In the present embodiment, the laser light source 10, the first, second, and third optical waveguides 12, 18, 22, the first and second distribution devices 16, 20, the control electrode, the output end surface 28, and the like are formed on the control circuit 40, and this enables direct high speed modulation of laser and high speed change of the direction of the output light beam in terms of time.

Third Embodiment

The optical device according to the present embodiment includes a substrate, a first wiring isolating layer formed on the substrate and made of a clad material, a first optical wiring layer formed on the first wiring isolating layer, including a first wiring layer clad made of the clad material and a first optical waveguide which is surrounded by the first wiring layer clad and which is made of a first core material having refractive index higher than the clad material, a second optical wiring layer formed above the first wiring isolating layer, including a second wiring layer clad and made of the clad material and a second optical waveguide which is surrounded by the second wiring layer clad, which extends away from and substantially parallel to the first optical waveguide, and which is made of the first core material, and a second wiring isolating layer including an surrounding layer formed between the first optical wiring layer and the second optical wiring layer and made of the clad material and a connection unit which is enclosed by the surrounding layer, which is in contact with the upper surface of the first optical waveguide and the lower surface of the second optical waveguide, and which is made of a second core material having a refractive index higher than the first core material. When the first optical waveguide, the connection unit, and the second optical waveguide are projected onto a plane parallel to the substrate, the connection unit is at an inner side with respect to any one of the first optical waveguide and the second optical waveguide.

The optical device according to the present embodiment includes a vertical multi-mode interference (MMI) optical coupler used for multilayer optical wiring using photonic wire waveguide. According to the present embodiment, with the above configuration, a practical vertical MMI optical coupler can be achieved, which is small and low-loss, and has high degree of tolerance in manufacturing, and can be used for connection between optical wiring layers of on-chip multilayer optical wiring.

When there is refractive index distribution in the first core material constituting the optical waveguide and the second core material of the connection unit, the above "refractive index" is considered to indicate a value obtained by averaging the refractive index in the cross section perpendicular to the direction of the light propagation which is common to the first, and second optical waveguides.

Figure 5A:
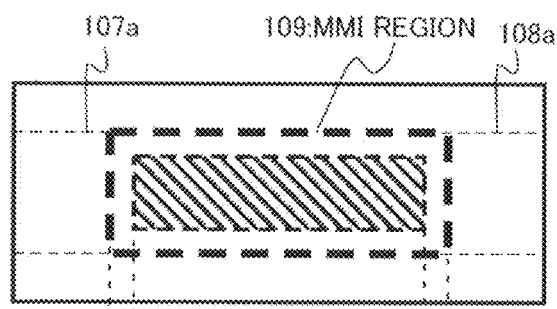
FIGS. 5A to 5C are schematic diagrams illustrating an optical device according to a third embodiment.
Figure 5B:
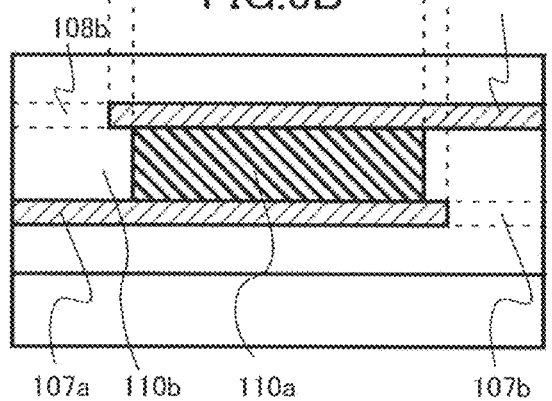
Figure 5C:
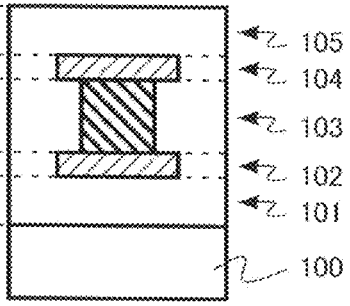

FIGS. 5A, 5B, and 5C are schematic diagrams illustrating an optical device according to the present embodiment. These are diagrams for explaining the configuration of 1×1 vertical MMI optical coupler for connection between optical wiring layers concerning the third embodiment. FIG. 5A is a projection drawing of a plane parallel to the substrate. FIG. 5B is a figure explaining an MMI cross section parallel to the direction of the light propagation. FIG. 5C is a figure explaining a cross section perpendicular to the direction of the light propagation.

An optical multilayer wiring layer including a vertical MMI optical coupler of the present embodiment is formed on a substrate 100, and includes five layers, that is, a first wiring isolating layer 101 having thickness 1 μm, a first optical wiring layer 102 having thickness 200 nm, a second wiring isolating layer 103 having thickness 400 nm, a second optical wiring layer 104 having thickness 200 nm, and a third wiring isolating layer 105 having thickness 1 μm, which are arranged from the lower side. Any of the layers is mainly made of a clad material of silicon oxide film ($SiO_2$) of which refractive index is 1.444 around wavelength 1550 nm.

The substrate 100 is, for example, silicon (Si). The first wiring isolating layer 101 is formed with, for example, a clad material of silicon oxide film.

The first optical wiring layer 102 is formed on the first wiring isolating layer 101. The first optical wiring layer 102 includes a first wiring layer clad 107b made of a clad material and a first optical waveguide 107a which is surrounded by the first wiring layer clad 107b and which is made of a first core material having a refractive index higher than the clad material.

The second optical wiring layer 104 is formed above the first wiring isolating layer 101 and the first optical wiring layer 102. The second optical wiring layer 104 includes a second wiring layer clad 108b made of a clad material and a second optical waveguide 108a which is surrounded by the second wiring layer clad 108b and which is made of a first core material having a refractive index higher than the clad material. The second optical waveguide 108a extends away from and substantially parallel to the first optical waveguide 107a.

The first core material is, for example, amorphous SiC (silicon carbide) having a refractive index 3.221. From the viewpoint of reducing the propagation loss of the light, the amorphous SiC is preferably amorphous SiC of which dangling bonds are hydrogen-terminated (a-SiC:H).

The first optical waveguide 107a and the second optical waveguide 108a are such that the width thereof in proximity to the MMI region 109 is, for example, 525 nm. The first optical waveguide 107a and the second optical waveguide 108a are preferably single mode waveguides from the viewpoint of avoiding propagation loss variation and increase of loss due to interference and the like. The waveguides support a fundamental TE mode with an effective refractive index of 2.142. The effective refractive index of the optical waveguide is a quantity which can be uniquely calculated when parameters such as the structure of the optical waveguide, the material, the wavelength of the propagating light are given.

The first optical waveguide 107a and the second optical waveguide 108a are arranged to overlap substantially parallel to each other in the vertical direction in a predetermined MMI region 109.

The second wiring isolating layer 103 is formed between the first optical wiring layer 102 and the second optical wiring layer 104. The second wiring isolating layer 103 includes surrounding layers 110b made of clad material and a connection unit 110a which is encircled by the surrounding layer 110b, which is in contact with the upper surface of the first optical waveguide 107a and the lower surface of the second optical waveguide 108a, and which is made of a second core material having refractive index higher than the first core material.

The connection unit 110a has, for example, a length 9.15 μm and a width 450 nm. The second core material that forms the connection unit 110a is, for example, amorphous Si (a-Si) of which refractive index is 3.48 at wavelength 1550 nm. From the viewpoint of reducing the propagation loss of the light, the amorphous Si is preferably amorphous Si of which dangling bonds are hydrogen-terminated (a-Si:H).

In this case, when the first optical waveguide 107a, the connection unit 110a, and the second optical waveguide 108a are projected onto the plane parallel to the substrate 100, the connection unit 110a is configured to be at the inner side with respect to any one of the first optical waveguide 107a and the second optical waveguide 108a. In the plane projection drawing of FIG. 5A, a region indicated by a thick broken line where the first optical waveguide 107a and the second optical waveguide 108b overlap each other is called the MMI region 109. The connection unit 110 is arranged so as not to be out of the MMI region 109 indicated by the thick broken line.

Figure 6:
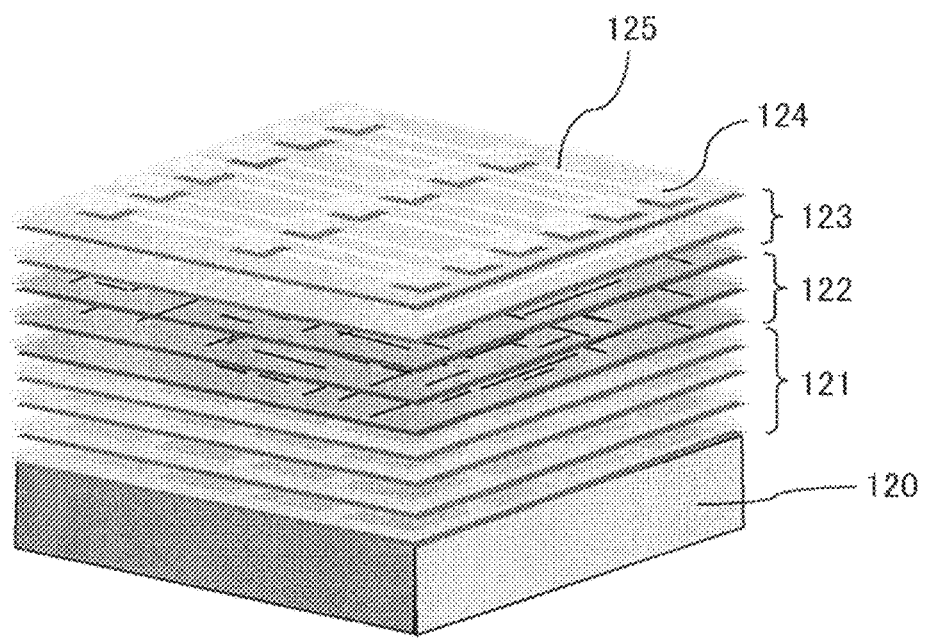
FIG. 6 is a schematic view for explaining a schematic configuration of a three-dimensional LSI chip according to the third embodiment.

FIG. 6 is a schematic view for explaining a schematic configuration of a three-dimensional LSI chip including the optical multilayer wiring. In order to simplify the explanation, FIG. 6 is drawn as follows. The wiring isolating layer between each electric wiring layer and the optical wiring layer is omitted, and the number of stacked layers is less than the actual number, and the thickness of each layer is thicker than the actual thickness.

This three-dimensional LSI chip includes a three-dimensional LSI 121 made by stacking logic circuits and memories on a Si substrate 120, multiple electric wiring layers 122 formed thereon, and two layers of optical wiring layers 123 stacked thereon.

In the optical wiring layer 123, multiple LD/PD arrays 124 are integrated so as to correspond to the respective functional blocks in the three-dimensional LSI 121. The LD/PD arrays 124 are connected by the optical waveguide 125 formed on optical wiring layer 123.

The optical waveguide of the lower optical wiring layer and the optical waveguide of the upper optical wiring layer are arranged in such a manner that the main propagation direction of the lights are perpendicular to each other. Crosstalk and loss at the two-level perpendicular crossing of the upper and lower optical waveguides can almost be disregarded when the thickness of the wiring isolating layer between the optical wiring layers is 400 nm. The upper and lower optical wiring layers can be connected using, for example, the vertical MMI optical couple as illustrated in FIGS. 5A to 5C and the arc shaped waveguide with a radius of 5 µm.

A manufacturing method of an optical device according to the present embodiment includes forming a first clad material on a substrate, forming, on the first clad material, a first optical waveguide made of a first core material having a refractive index higher than the first clad material, forming, on the first optical waveguide, a second clad material having a refractive index lower than the first core material, polishing the second clad material, and exposing the first optical waveguide, forming, on the first optical waveguide and the second clad material, a third clad material having a refractive index less than the first core material, forming, in the third clad material, a trench which reaches the first optical waveguide wherein an entire region of a lower portion of an opening portion thereof is at an upper surface of the first optical waveguide, burying the trench with a second core material having a refractive index higher than the first core material, polishing the second core material, and exposing the third clad material, forming, on the third clad material, a second optical waveguide which is made of a first core material, and of which lower surface covers all of an upper surface of the second core material, and which extends substantially parallel to the first optical waveguide, forming, on the second optical waveguide, a fourth clad material having a refractive index less than the first core material.

FIG. 7 to FIG. 18 are figures schematically explaining a manufacturing method of the present embodiment. The main manufacturing steps of the vertical MMI optical coupler of the present embodiment will be shown schematically. FIG. 7A to FIG. 18A illustrate the MMI cross section parallel to the optical propagation direction, and FIG. 7B to FIG. 18B illustrate the MMI cross section perpendicular to the optical propagation direction in a side by side manner.

When the optical waveguide and the trench are formed, etching is performed under such condition that the unevenness of the sidewall is small and the sidewall is vertical as much as possible. In order to simplify the explanation, the following steps are omitted: cleaning, coating resist, mask alignment, exposure, development, formation of mask material used for etching, removal of resist and mask material, cleaning, and the like.

Figure 7A:
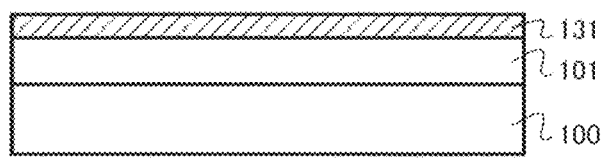
FIGS. 7A and 7B are figures schematically explaining a manufacturing method of the third embodiment.
Figure 7B:
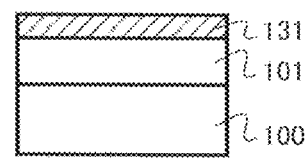

The first optical wiring layer 102 is formed according to the steps as shown in FIGS. 7A to 103. First, the first wiring isolating layer 101 is formed on the substrate 100. The first wiring isolating layer 101 is formed with $SiO_2$ film which is the first clad material.

Figure 8A:
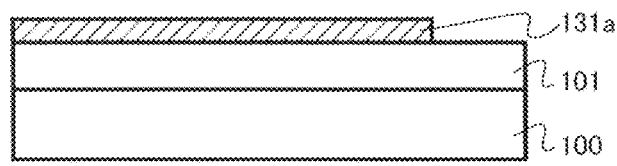
FIGS. 8A and 8B are figures schematically explaining a manufacturing method of the third embodiment.
Figure 8B:
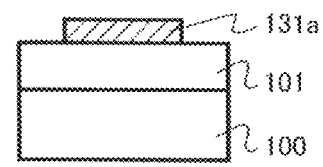

Subsequently, the a-SiC film (first core material) 131 is deposited to have a thickness of 220 nm on the first wiring isolating layer 101 by plasma-assisted chemical vapor deposition (plasma CVD) at a deposition temperature of 300 degrees Celsius (FIG. 7). Subsequently, the a-SiC film 131 is etched so as to leave only the region 131a which becomes the first optical waveguide 107a (FIG. 8).

Figure 9A:
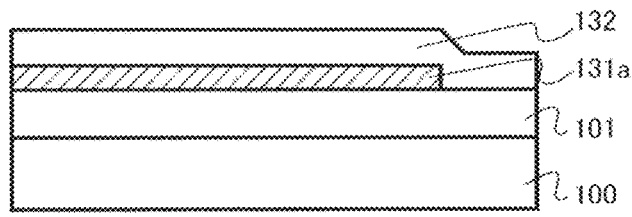
FIGS. 9A and 9B are figures schematically explaining a manufacturing method of the third embodiment.
Figure 9B:
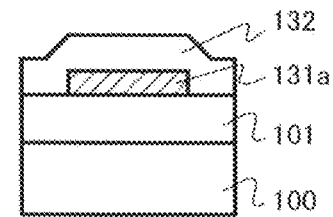
Figure 10A:
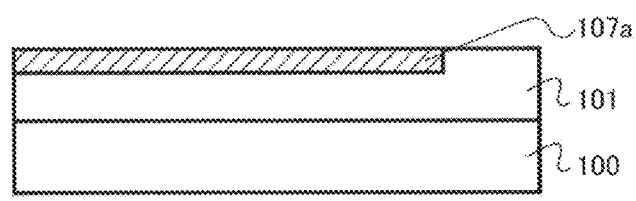
FIGS. 10A and 10B are figures schematically explaining a manufacturing method of the third embodiment.
Figure 10B:
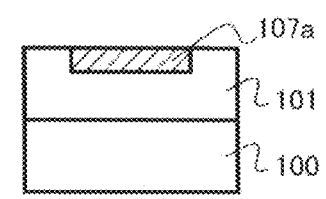

Subsequently, the $SiO_2$ film 132 which becomes the second clad material is deposited by plasma CVD on the surface (FIG. 9). Subsequently, by chemical mechanical polishing (CMP), the complex structure formed in the steps of FIG. 7 to FIG. 9 is polished/planarized, so that the thickness of the first optical wiring layer 102 becomes 200 nm (FIG. 10). At this occasion, the surface of the first optical waveguide 107a is exposed.

Figure 11A:
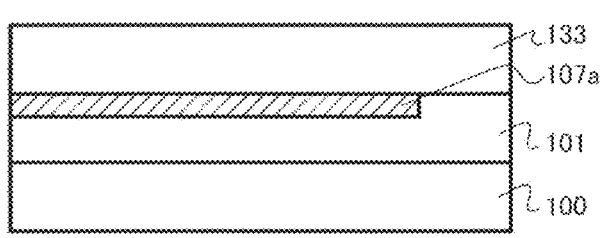
FIGS. 11A and 11B are figures schematically explaining a manufacturing method of the third embodiment.
Figure 11B:
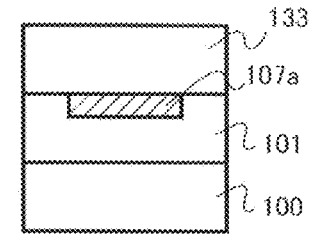
Figure 12A:
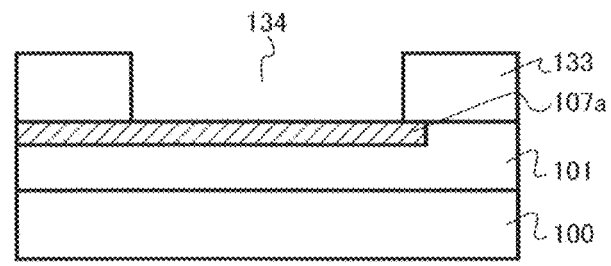
FIGS. 12A and 12B are figures schematically explaining a manufacturing method of the third embodiment.
Figure 12B:
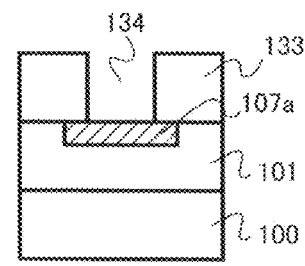

The second wiring isolating layer 103 is formed by the steps as shown in FIGS. 11A to 14B. First, on the first optical wiring layer 102 including the first optical waveguide 107a, the $SiO_2$ film (third clad material) 133 having a thickness 420 nm is deposited by plasma CVD (FIG. 11). In a portion of the $SiO_2$ film 133 where the connection unit 110a is formed, a trench 134 reaching the first optical waveguide 107a is formed by etching (FIGS. 12A to 12B). Processing is performed so that the entire lower portion of the opening portion of the trench is at the upper surface of the first optical waveguide 107a.

Figure 13A:
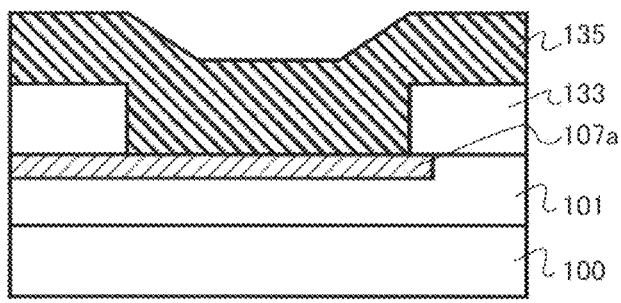
FIGS. 13A and 13B are figures schematically explaining a manufacturing method of the third embodiment.
Figure 13B:
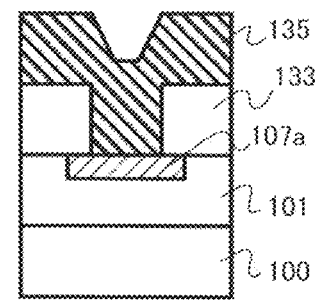
Figure 14A:
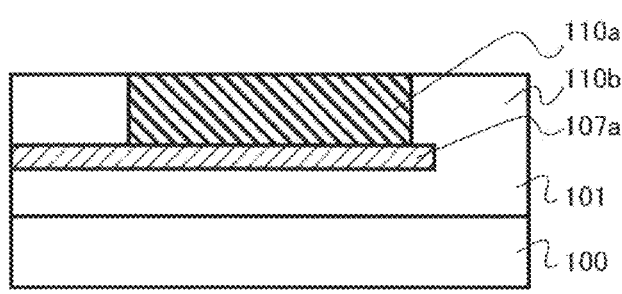
FIGS. 14A and 14B are figures schematically explaining a manufacturing method of the third embodiment.
Figure 14B:
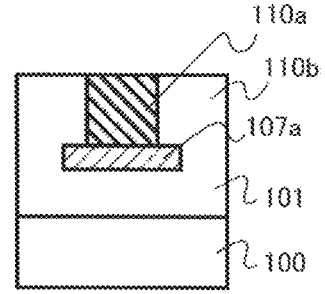
Figure 15A:
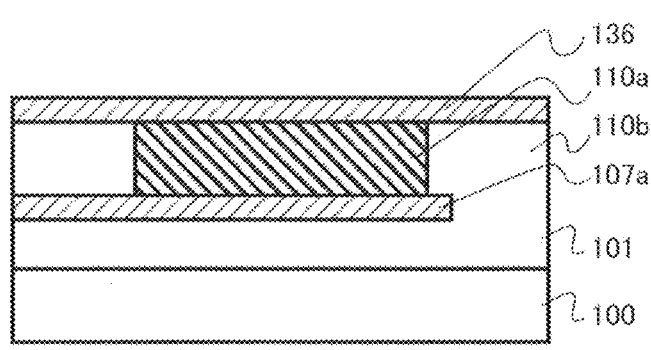
FIGS. 15A and 15B are figures schematically explaining a manufacturing method of the third embodiment.
Figure 15B:
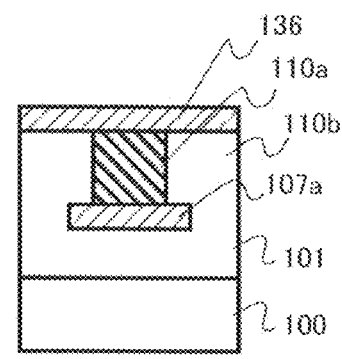
Figure 16A:
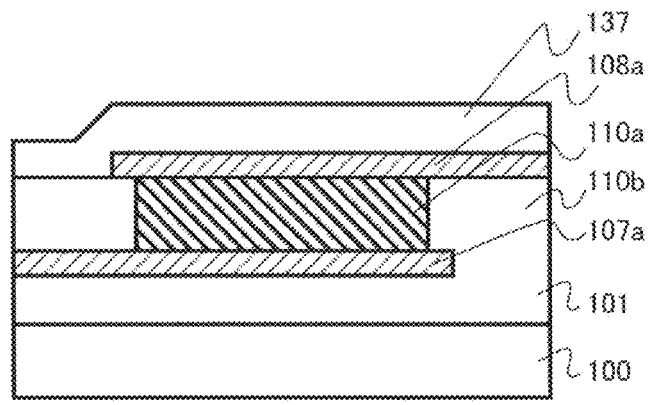
FIGS. 16A and 16B are figures schematically explaining a manufacturing method of the third embodiment.
Figure 16B:
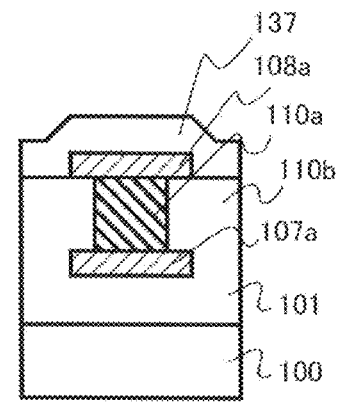

Then, the a-Si film (second core material) 135 having a high refractive index due to a-SiC is deposited by plasma CVD so that the trench 134 is buried to a predetermined height (FIGS. 13A and 13B). Subsequently, by CMP, the complex structure made in the steps of FIGS. 11A to 133 is polished/planarized, so that the thickness of the second wiring isolating layer 103 becomes 400 nm (FIGS. 14A and 14B).

With the CMP, processing is performed to expose the surface of the third clad material 133. With this step, the connection unit 110a and the surrounding layer 110b are formed.

Figure 17A:
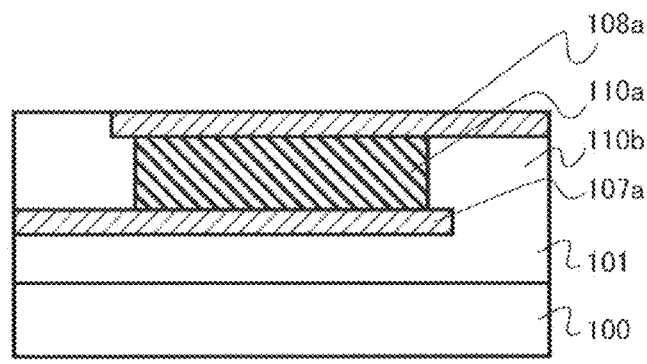
FIGS. 17A and 17B are figures schematically explaining a manufacturing method of the third embodiment.
Figure 17B:
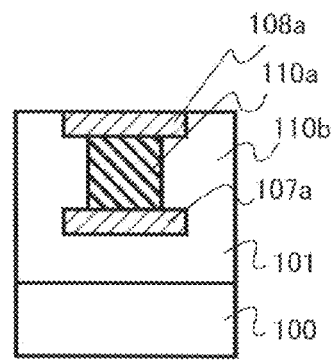

The second optical wiring layer 104 is formed by the following steps: deposition of the a-SiC film 136 by plasma CVD (FIG. 15), formation of the region which becomes the second optical waveguide 108a by etching, and deposition of the $SiO_2$ film 137 which is the fourth clad material (FIG. 16), and the step of CMP (FIG. 17). The detailed condition of each step are the same as those for manufacturing the first optical wiring layer 102 corresponding thereto, and accordingly descriptions thereabout are omitted.

It should be noted that processing is performed so that the lower surface of the second optical waveguide 108a covers all of the upper surface of the second core material. The second optical waveguide 108a is processed to extend substantially parallel to the first optical waveguide.

Figure 18A:
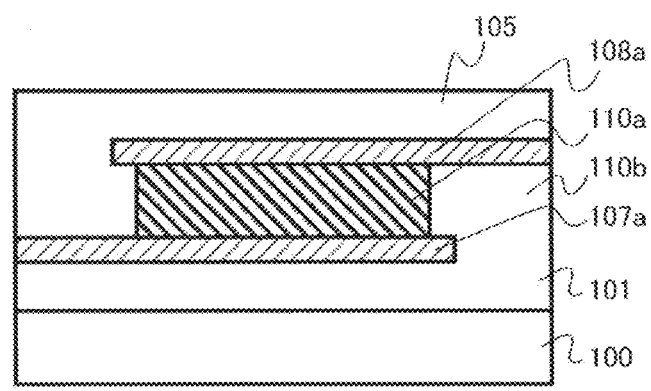
FIGS. 18A and 18B are figures schematically explaining a manufacturing method of the third embodiment.
Figure 18B:
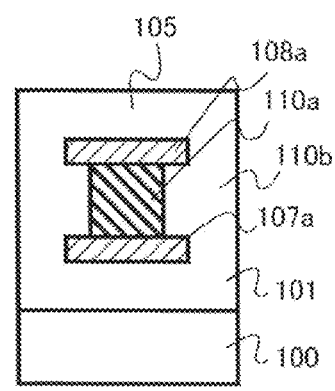

Finally, when the $SiO_2$ film (fifth clad material) that becomes the third wiring isolating layer 105 is deposited by plasma CVD, the vertical MMI optical coupler is formed in the clad material of $SiO_2$ (FIG. 18). After CMP as illustrated in FIG. 17, three or more multilayer optical wiring layers can be made by repeating the steps in FIGS. 11A to 18B.

The vertical MMI optical coupler of the present embodiment is such that, for example, the width of the trench 134 is 450 nm, and the width of the first optical waveguide 107a is 525 nm. Therefore, even if the alignment error of the stepper is 25 nm, the first optical waveguide 107a surely exists under the region where the trench 134 is formed in the step of FIG. 12. Therefore, when the trench 134 is formed in the $SiO_2$ film 133, the etching may be stopped when the a-SiC of the first optical waveguide 107a is exposed.

Etching gases for $SiO_2$ that can have certain level of selectivity with respect to underlying SiC are known to include, for example, $CF_4/H_2$, $CHF_3/O_2$, and the like. When such etching gas is used, etching rate can be suppressed as soon as the a-SiC is exposed.

At this occasion, even when etching is performed a little bit excessively to the underlying a-SiC 107a, the refractive indexes of the underlying a-SiC film 107a and the a-Si film 135 deposited immediately thereafter are relatively close, and therefore, the characteristics of the MMI optical coupler is affected with a relatively low degree. In order to suppress the effect caused on the characteristics of the MMI optical coupler due to over etching, the difference of the refractive indexes between the first core material and the second core material is preferably within 10%.

In contrast, if the width of the trench 134 is not sufficiently narrowed, a portion of the underlying $SiO_2$ film 132 is etched during etching of the trench 134, in a portion that is out of the first optical waveguide 107a due to alignment error and the like. When the trench is embedded with the a-Si film 135, the cross section shape of the MMI optical coupler is seriously changed because the a-Si is also deposited at the etched portion beside the first optical waveguide 107a.

According to the present embodiment, the pattern of the second optical waveguide 108a completely covers the connection unit 110a, and therefore, all the underlayer during etching of the second optical waveguide 8 is the $SiO_2$ film 133 (110b). Therefore, the etching of the second optical waveguide may be stopped when the $SiO_2$ film 133 is exposed.

Etching gases for Si that can have certain level of selectivity with respect to the underlying $SiO_2$ film 133 are known to include, for example, $CF_4/O_2$, $SF_6/CH_4/N_2/O_2$, $SF_6/Cl_2/Ar$, and the like. Even when etching is performed somewhat excessively to the underlying $SiO_2$ film 133, it is buried during the deposition of the $SiO_2$ film 137 immediately thereafter, and planarized by CMP, and therefore, the shape of the MMI optical coupler would not be changed.

In contrast, if the connection unit 110a is out of the pattern of the second optical waveguide 108a, a portion of the connection unit 110a that is out of the second optical waveguide 108a is also etched from above, and the shape of the MMI optical coupler is changed.

Subsequently, the operation of characteristics of the vertical MMI optical coupler of the present embodiment will be explained.

FIG. 19 is a schematic view illustrating an optical device according to a modification of the present embodiment. The first, and second optical waveguides 107a, 108a of the above embodiments have a structure including the a-SIC single layer of refractive index 3.221. However, in the present modification, it is three-layer structure as illustrated in FIG. 19.

More specifically, the first optical waveguide 147 has the three-layer structure including a-SiC 147a (thickness 75 nm, refractive index 3.1)/a-Si 147b (thickness 50 nm, refractive index 3.48)/a-SiC 147c (thickness 75 nm, refractive index 3.1). Likewise, the second optical waveguide 148 has the three-layer structure including a-SiC 148a (thickness 75 nm, refractive index 3.1)/a-Si 148b (thickness 50 nm, refractive index 3.48)/a-SiC 148c (thickness 75 nm, refractive index 3.1).

In other words, the first core material forming the first and second optical waveguides has complex material. With this three-layer structure, both of the first optical waveguide and the second optical waveguide have the structures having the refractive index distribution in the thickness direction such that the refractive index of the optical waveguide central portion have refractive index higher than the refractive index at portions at the upper and lower ends. It should be noted that any one of the first optical waveguide and second optical waveguide may have structure having the refractive index distribution.

The present modification is the same as the first embodiment except that the structure of the optical waveguide is different. Thereafter, the structure of the embodiment as illustrated in FIG. 5 is called Type-A, and the structure of the modification as illustrated in FIG. 19 is called Type-B. Hereinafter, the operation of characteristics of both of Type-A and Type-B will be explained.

The first, and second optical waveguides 147, 148 of Type-B is also TE single mode waveguides having a width 525 nm, and the effective refractive index of the fundamental TE mode is 2.142 which is about the same as Type-A.

Figure 20A:
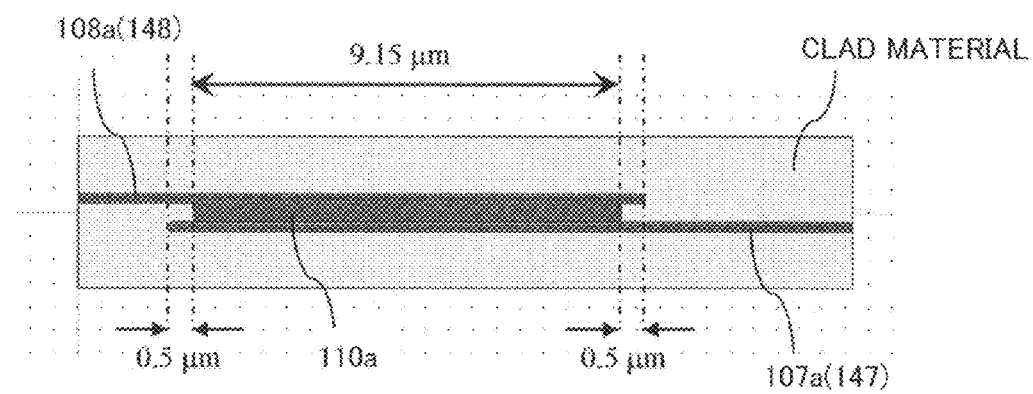
FIGS. 20A and 20B are figures illustrating a simulation result of optical propagation of an optical coupler of the third embodiment.

FIG. 20 is a figure illustrating a simulation result of optical propagation of an optical coupler of the vertical MMI optical coupler of the present embodiment. FIG. 20A is a cross section structure common to Type-A, Type-B. In any of Type-A, Type-B, the length of the connection unit 110a is 9.15 μm, and each of the first optical waveguides 107a, 147 and the second optical waveguides 108a, 148 is terminated at a position about 0.5 μm from the end of the connection unit 110a. The width of the connection unit 110a is 450 nm.

Figure 20B:
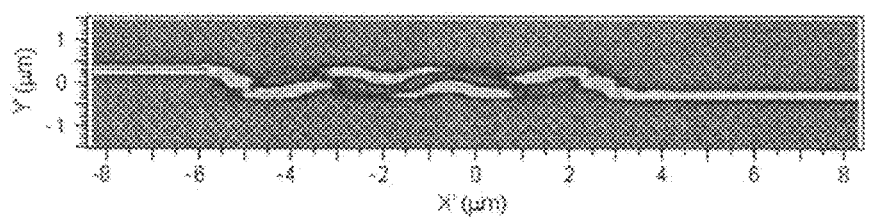

FIG. 20B is a result obtained by calculating, according to Finite Difference Time Domain (FDTD) method, optical propagation where the light is incident from the left side of the second optical waveguide 148 of the vertical MMI optical coupler of Type-B in an ideal case where there is no offset between layers.

The MMI region including the first optical waveguide 147, the connection unit 110a, and the second optical waveguide 148 has three symmetric TE modes and one asymmetric TE mode having a node in the center in lateral direction. When the offset of the input waveguide 148 is small, three symmetrical TE modes are excited at the incident portion of the MMI optical coupler, and the interference causes intensity pattern as shown in FIG. 20B. Although there is some minor difference as explained later, the interference pattern of Type-A is almost the same.

FIG. 21 is a figure illustrating optical power distribution of the vertical MMI optical coupler according to the present embodiment. The vertical axis is the position in the thickness direction in the optical waveguide, and the horizontal axis is the optical power intensity. In the present embodiment, within the range from the MMI incident surface to the propagation distance 9.15 μm, there are three peaks of the optical distribution in the first optical wiring layer 102, where the distance (MMI length) from the MMI incident surface is around A 1.35 μm, B 6.2 μm, and C 9.15 μm.

Figure 21A:
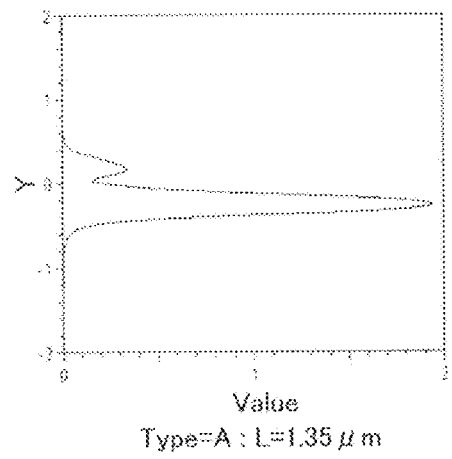
FIGS. 21A to 21D are figures illustrating optical power distribution of an optical coupler according to the third embodiment.
Figure 21B:
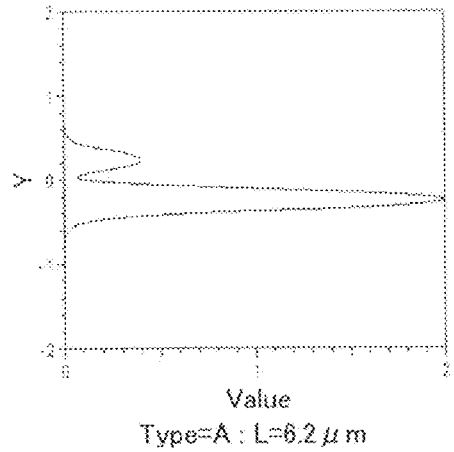
Figure 21C:
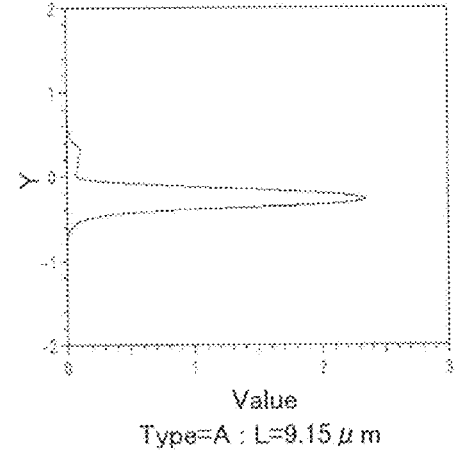

FIGS. 21A, 21B, and 21C are optical power distributions in the MMI cross section with the positions A, B, C of Type-A. Even when the MMI length is as follows: A $L_{MMI}$=1.35 μm, $BL_{MMI}$=6.2 μm, the optical wiring layers can be connected, but in a case of $CL_{MMI}$=9.15 μm in which the sub-peak at the upper side of MMI is small, the highest coupling efficiency (89%) can be obtained.

In a case of plane MMI optical coupler, the width around the connection point to the MMI optical coupler of the input/output waveguide is widened in a tapered manner, and accordingly, the coupling efficiency can be improved. In contrast, in the vertical MMI optical coupler in which a flat optical wiring layer and a wiring isolating layer are alternately made, it is extremely difficult to achieve the taper structure in the thickness direction. Type-B is the structure which was introduced in order to improve the coupling efficiency with the focusing effect due to the refractive index distribution in the optical waveguide.

Figure 21D:
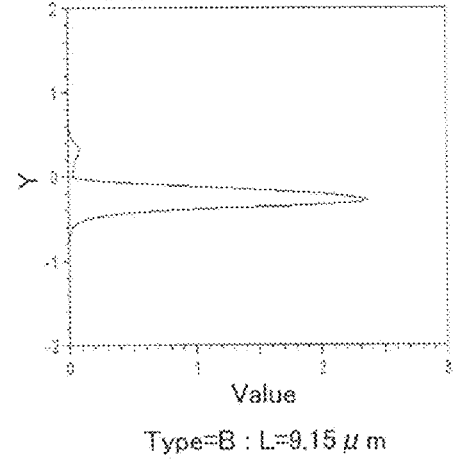

FIG. 21D is a figure illustrating optical power distribution in the MMI cross section at the position which is 9.15 μm from the MMI incident surface of Type-B. The main peak of Type-A of FIG. 21C is the position 35 nm above the center of the first optical waveguide 107a, but in Type-B of FIG. 21D, the peak is at the position which is 22 nm above the center of the first optical waveguide 147.

Due to the effect of attracting the light to the center of the optical waveguide due to the refractive index distribution, the optical coupling efficiency of Type-B is 90%. Although the difference is small, that is 1%, the effect of improvement can be found.

As described above, the alignment accuracy with a high precision stepper is about ±20 nm. For this reason, with a very small vertical MMI optical coupler using photonic wire waveguides, the effect of offset between layers appear significantly.

Figure 22A:
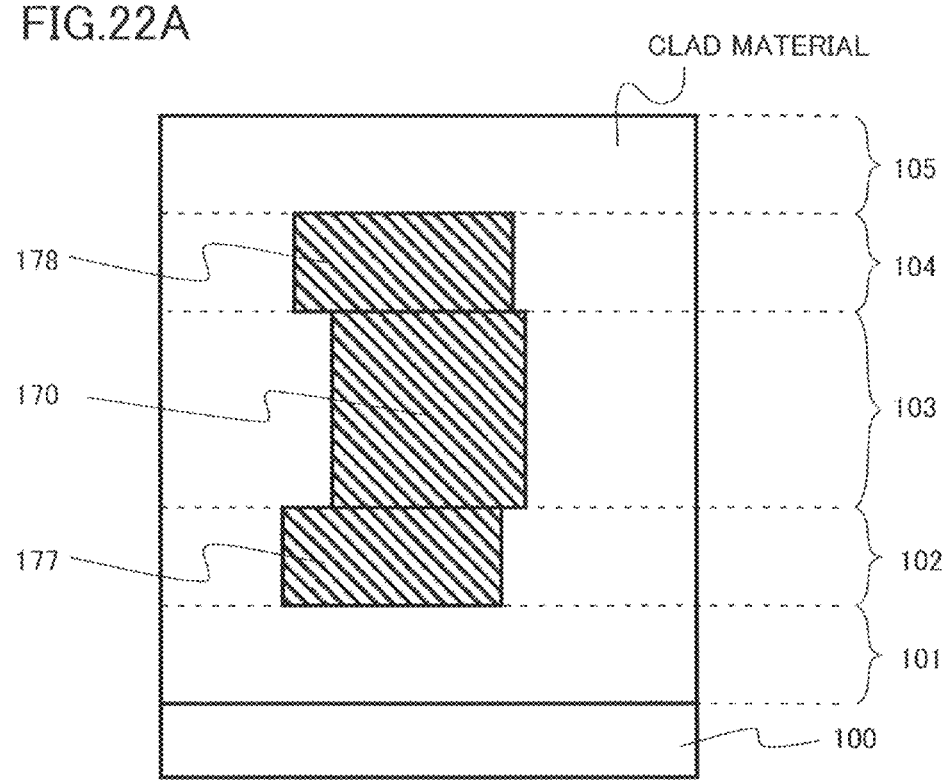
FIGS. 22A and 22B are figures illustrating a simulation result of optical propagation of an optical coupler of a comparative embodiment.
Figure 22B:
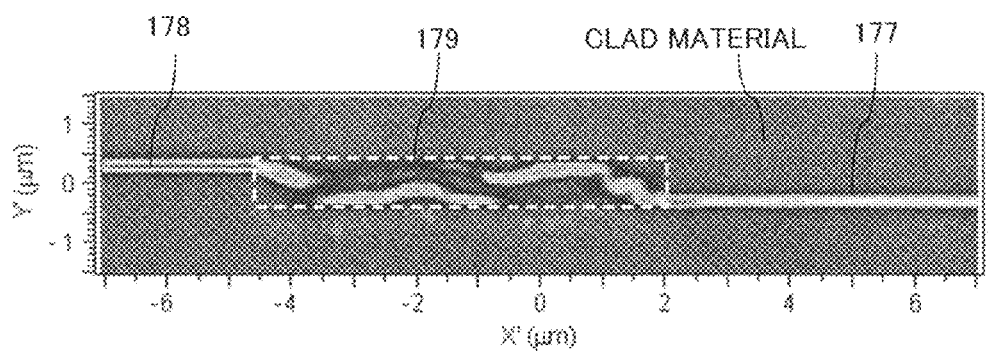

FIGS. 22A to 22B are figures illustrating a simulation result of optical propagation of the vertical MMI optical coupler of a comparative embodiment. FIG. 22A is a figure schematically illustrating a structure in a cross section perpendicular to the optical propagation direction of the 1×1 vertical MMI optical coupler connecting the optical wiring layers.

In this mode, the second optical waveguide 178 (input optical waveguide) in the second optical wiring layer 104, the optical waveguide 177 (output optical waveguide) in the first optical wiring layer 102, and the connection unit 170 in the second wiring isolating layer 103 are all formed with the same a-Si (refractive index 3.48).

In the present comparative embodiment, the refractive index of the optical waveguide is higher than that in the first embodiment and therefore, the width of the optical waveguides 177, 178 was set to 450 nm in order to make the waveguide single mode. The effective refractive index of the TE mode is 2.272.

Although it is difficult to actually fabricate it, the following case is explained: the width of the connection unit 170 between optical wiring layers is 450 nm which is the same as that of the optical waveguides, and there is offset between layers. The length of the connection unit 170 is as follows: $L_{MMI}$=6.6 µm, where the highest coupling efficiency can be obtained within 10 µm from the incident surface. FIG. 22B shows optical propagation in a case where there is no offset. The position of the MMI region 179 is indicated by a dotted line in the figure.

Figure 23A:
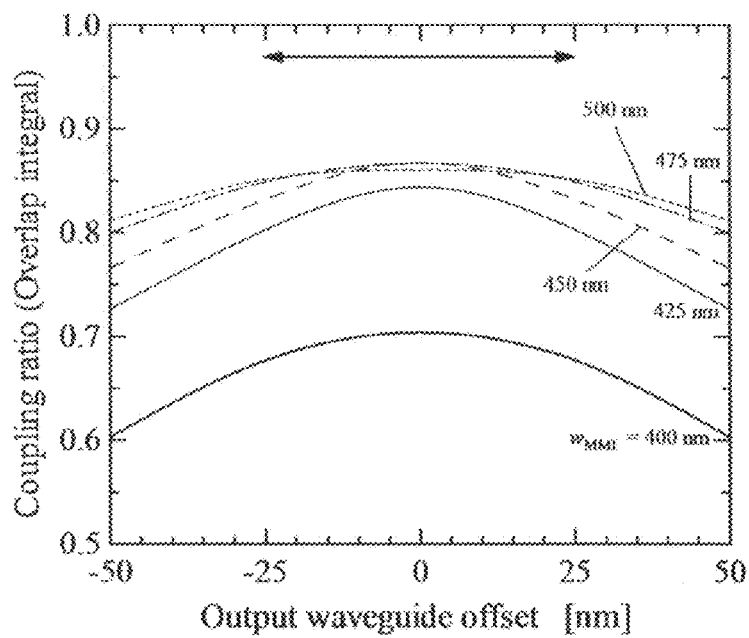
FIGS. 23A and 23B are figures illustrating calculation result of layer offset dependency of coupling efficiency of an optical coupler according to the comparative embodiment.
Figure 23B:
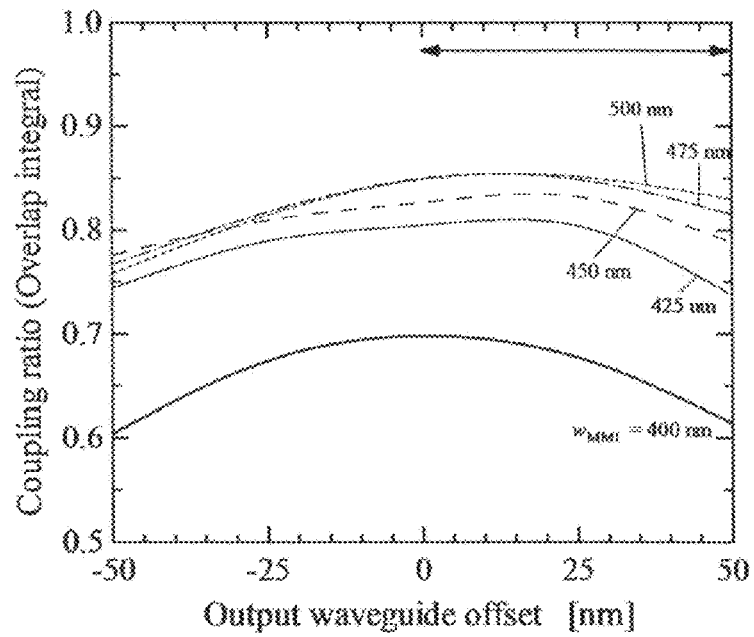

FIGS. 23A to 23B are figures illustrating calculation results of layer offset dependency of coupling efficiency of the vertical MMI optical coupler according to the comparative embodiment. FIG. 23A is a calculation result in a case where there is no offset between the input optical waveguide 178 and the connection unit 170, more specifically, in a case where the centers are matched. FIG. 23B is a calculation result in a case where the connection unit 170 is deviated 25 nm with respect to the input optical waveguide 178. The horizontal axis is the offset between the input optical waveguide 178 and the output optical waveguide 177.

If the offset error of the stepper is ±25 nm, the width $W_{MMI}$ of the connection unit 170 is required to be equal to or less than 400 nm in order to avoid deformation of the MMI optical coupler during etching due to the offset. Although it is difficult to actually fabricate it, a calculation result of the following cases are also shown: $W_{MMI}$=425 nm, 450 nm, 475 nm, 500 nm.

When there is offset up to ±25 nm between the upper and lower layers, the range indicated by a line with arrows at the upper portion of FIGS. 23A and 23B is a range in which it may occur. The worst case is the case shown at the right end of FIG. 23B, in which the connection unit 170 and the output waveguide 177 are deviated 25 nm, 50 nm, respectively, with respect to the input waveguide 178 in the same direction.

If the connection unit 170 is wider than input/output waveguides 177, 178 by about 25 to 50 nm, at least 81% or higher coupling efficiency can be obtained. However, in view of the alignment error between layers during the actual manufacturing process, the width of the connection unit 170 should be reduced by 50 nm or more. In this case, even if there is no offset at all, the coupling efficiency is only 70%, and in the worst case, it is reduced to 61%.

Figure 24:
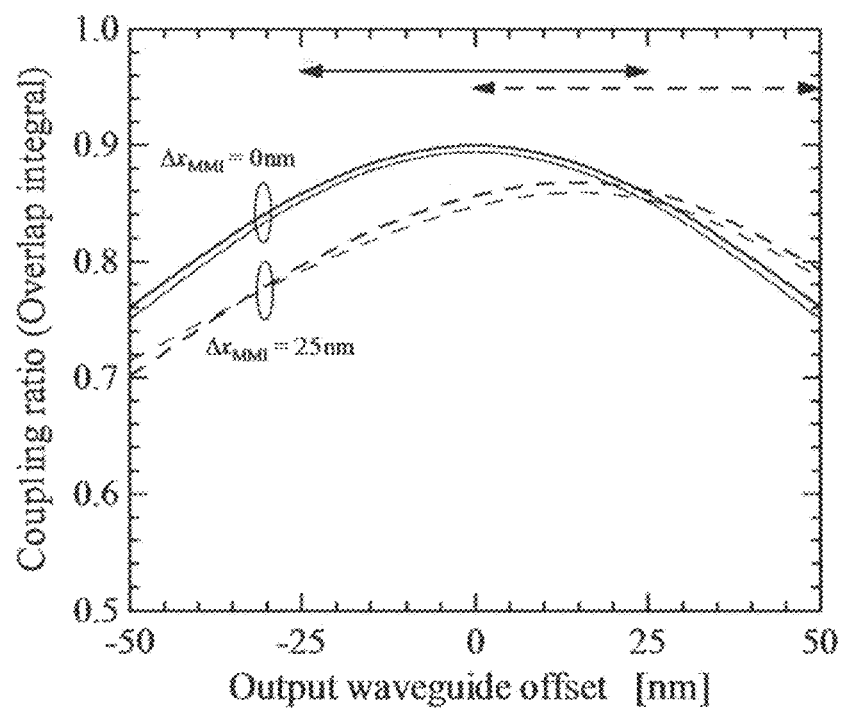
FIG. 24 is a figure illustrating calculation result of layer offset dependency of coupling efficiency of an optical coupler according to the third embodiment and a modification.

FIG. 24 is a calculation result of offset dependency of the coupling efficiency of the vertical MMI optical coupler of the present embodiment and modification. A thick line denotes Type-B (modification). A thin line denotes Type-A (embodiment). A solid line denotes a case where there is no offset of the connection unit 110a. A broken line denotes a case where the offset of the connection unit 110a is 25 nm.

In each of them, the range indicated by a line with arrows at the upper portion of the figure denotes a range that may occur where the layer alignment accuracy is ±25 nm. In the worst case, the connection unit 110a and the output waveguides 107a, 147 are deviated by 25 nm, 50 nm, respectively, (the right end of the broken line) with respect to the input waveguides 108a, 148 in the same direction. Even in this case, the coupling efficiency of 79% can be obtained.

As described above, the vertical MMI optical coupler of the present embodiment and modification includes a connection unit of the second core material having a refractive index higher than the first core material forming the first optical waveguide and the second optical waveguide. For this reason, the adverse effect due to the difference of the widths of the optical waveguides 107a, 108, 147, 148 and the connection unit 110 is somewhat compensated by the refractive index difference. Therefore, even when there is offset of about ±25 nm between layers, the reduction of the coupling efficiency can be suppressed.

The width of the connection unit is preferably narrower than any one of the widths of the first optical waveguide and the second optical waveguide by 50 nm or more, so as to prevent reduction of the coupling efficiency due to deformation of the coupler structure even when the layer alignment error is as much as ±25 nm.

Fourth Embodiment

An optical device according to the present embodiment includes a substrate, a first wiring isolating layer formed on the substrate and made of a clad material, a first optical wiring layer including a first wiring layer clad formed on the first wiring isolating layer and made of the clad material and a first optical waveguide which is surrounded by the first wiring clad and which is made of a first core material having refractive index higher than the clad material, a first boundary layer formed on the first optical wiring layer and made of a boundary material having a refractive index higher than the clad material and lower than the first core material, a second boundary layer formed above the first boundary layer and made of the boundary material, a second optical wiring layer including a second wiring layer clad formed on the second boundary layer and made of the clad material and a second optical waveguide which is surrounded by the second wiring layer clad, which extends substantially parallel to the first optical waveguide, and which is made of the first core material, and a second wiring isolating layer including an surrounding layer formed between the first boundary layer and the second boundary layer and made of the clad material and a connection unit which is encircled by the surrounding layer, which is in contact with the upper surface of the first boundary layer and the lower surface of the second boundary layer, and which is made of a second core material having a refractive index higher than the boundary material. When the first optical waveguide, the connection unit, the second optical waveguide are projected onto a plane parallel to the substrate, there is a region in which all of the first optical waveguide, the connection unit, and the second optical waveguide overlap each other.

The optical device according to the present embodiment is different from the third embodiment in that the optical device includes the first and second boundary layers functioning as etch stop layers during manufacturing. Further, the optical device according to the present embodiment is different from the third embodiment in that there is no particular definition with regard to the relationship of size between the connection unit and the first and second optical waveguides. Further, the optical device according to the present embodiment is different from the third embodiment in that the refractive index of the second core material is not necessarily required to be higher than the first core material. The optical device according to the present embodiment is basically the same as the third embodiment except the above three features. Accordingly, descriptions about the same contents as those of the third embodiment are omitted.

According to the present embodiment, the first and second boundary layers (etch stop layer) are provided so that a vertical MMI optical coupler can be achieved, which has a high degree of flexibility in design and which can be manufactured easily than the third embodiment.

Figure 25A:
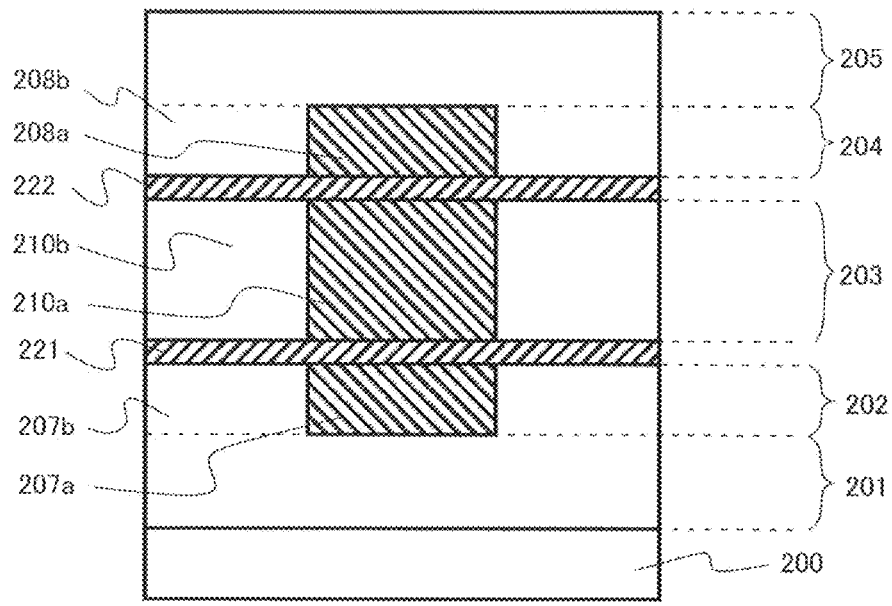
FIGS. 25A and 25B are a schematic view illustrating an optical device according to a fourth embodiment and a simulation result of optical propagation thereof, respectively.
Figure 25B:
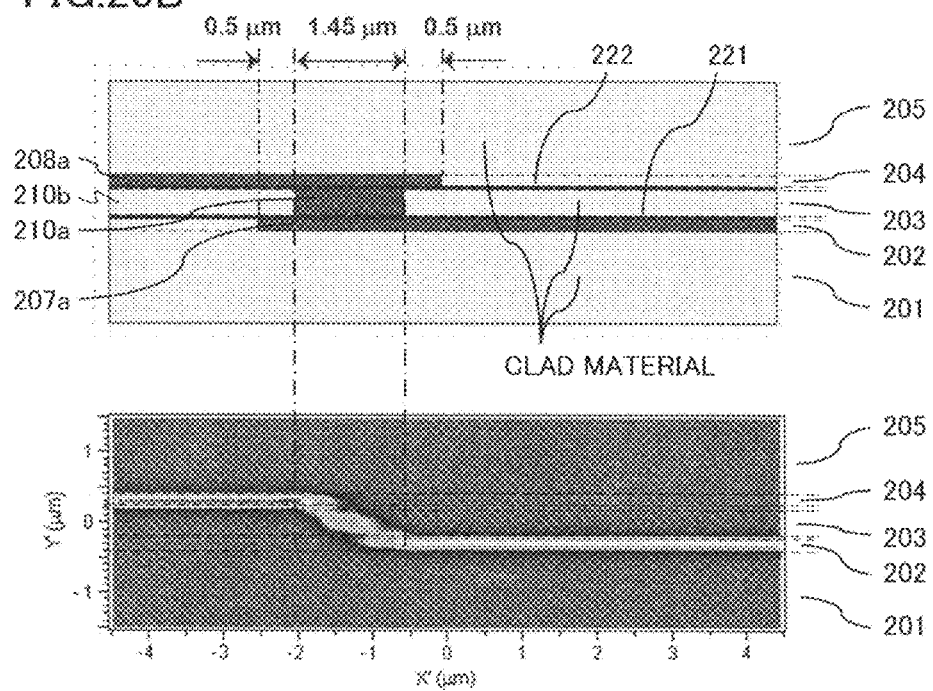
Figure 26A:
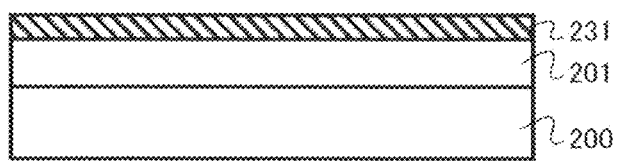
FIGS. 26A and 26B are figures schematically explaining a first manufacturing method of the fourth embodiment.
Figure 26B:
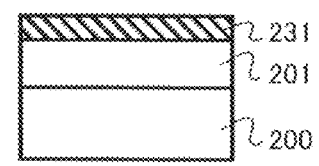

FIG. 25 is a schematic view illustrating an optical device according to the present embodiment. This is a figure for explaining the configuration of 1×1 vertical MMI optical coupler for connection between optical wiring layers concerning the fourth embodiment. FIG. 25A is a figure explaining MMI cross section perpendicular to the direction of light propagation. FIG. 25B is a figure explaining a cross sectional structure parallel to the advancing direction of the light (upper side) and optical propagation parallel to the direction of light propagation (lower side).

The optical multilayer wiring layer including the vertical MMI optical coupler of the present embodiment is formed on a substrate 200, and includes at least seven layers, that is, a first wiring isolating layer 201 of which thickness is 1 μm or more, a first optical wiring layer 202 having a thickness 160 nm, a first boundary layer (first etch stop layer) 221 having a thickness 40 nm, a second wiring isolating layer 203 having a thickness 360 nm, a second boundary layer (second etch stop layer) 222 having a thickness 40 nm, a second optical wiring layer 204 having a thickness 160 nm, and a third wiring isolating layer 205 of which thickness is 1 μm or more, which are arranged from the lower side in order.

The substrate 200 is, for example, silicon (Si). The first wiring isolating layer 201 is formed with, for example, a clad material of silicon oxide film.

The first optical wiring layer 202 is formed on the first wiring isolating layer 201. The first optical wiring layer 202 includes a first wiring layer clad 207b made of a clad material and a first optical waveguide 207a which is surrounded by the first wiring layer clad 207b and which is made of a first core material having a refractive index higher than the clad material.

The second optical wiring layer 204 is formed above the first wiring isolating layer 201. The second optical wiring layer 204 includes a second wiring layer clad 208b made of a clad material and a second optical waveguide 208a which is surrounded by the second wiring layer clad 208b and which is made of a first core material having a refractive index higher than the clad material. The second optical waveguide 208a extends away from and substantially parallel to the first optical wiring layer 207a.

First boundary layer 221 is formed on the first optical wiring layer 201, and is made of a boundary material having a refractive index higher than the clad material and having a refractive index lower than the first core material. The second boundary layer 222 is formed above the first boundary layer 221, and is made of a boundary material having a refractive index higher than the clad material and having a refractive index lower than the first core material.

The second wiring isolating layer 203 includes an surrounding layer 210b formed between the first boundary layer 221 and the second boundary layer 222 and made of the clad material, and a connection unit 210a which is encircled by the surrounding layer 210b, which is in contact with the upper surface of the first boundary layer 221 and the lower surface of the second boundary layer 222, and which is made of a second core material having a refractive index higher than the boundary material. From the perspective of suppressing the loss of the light, the refractive index of the second core material is preferably not greatly different from the refractive index of the first core material (It is preferable to restrict the difference to 10% or less).

The first and second boundary layers 221, 222 have a refractive index between that of the first core material and that of the clad material. In the present embodiment, a silicon nitride film (SiN film) of which refractive index is about 1.9 is used. The clad material is a silicon oxide film ($SiO_2$) of which refractive index is 1.444. The first core material and the second core material is amorphous Si (a-Si) of which refractive index is 3.48. From the viewpoint of reducing propagation loss of the light, the amorphous Si is preferably amorphous Si of which dangling bonds are hydrogen-terminated (a-Si:H).

The first and second optical waveguides 207a, 208a are arranged to overlap substantially parallel to each other in the vertical direction in the predetermined MMI region, wherein the waveguide width in proximity to the MMI region is 425 nm. The length of the connection unit 210a in the second wiring isolating layer 203 is, for example, 1.45 μm, and the width thereof is 425 nm.

A first manufacturing method of an optical device according to the present embodiment includes forming a first clad material on a substrate, forming, on the first clad material, a first optical waveguide made of a first core material having a refractive index higher than the first clad material, forming, on the first optical waveguide and the first clad material, a second clad material having a refractive index lower than the first core material, polishing the second clad material, so that the first optical waveguide is exposed, forming, on the first optical waveguide and the second clad material, a first etch stop layer having a refractive index higher than the first and the second clad materials and made of an etch stop material having a refractive index lower than the first core material, forming, right above the first optical waveguide on the first etch stop layer, a connection unit made of a second core material having a refractive index higher than the etch stop material, by stopping etching of the second core material at the first etch stop layer, forming, on the connection unit and the first etch stop layer, a third clad material having a refractive index less than the etch stop material, polishing the third core material, so that the connection unit is exposed, forming, on the connection unit and the third clad material, a second etch stop layer made of the etch stop material, forming, right above the connection unit on the second etch stop layer, a second optical waveguide made of the first core material, by stopping etching of the first core material at the second etch stop layer, and forming, on the second optical waveguide and the second etch stop layer, a fourth clad material having a refractive index less than the etch stop material.

FIGS. 26A to 36B are figures schematically explaining the first manufacturing method of the present embodiment. The main manufacturing steps of the vertical MMI optical coupler of the present embodiment is shown schematically. FIG. 26A to FIG. 36A illustrate the MMI cross section parallel to the optical propagation direction, and FIG. 26B to FIG. 36B illustrate the MMI cross section perpendicular to the optical propagation direction in a side by side manner.

When the optical waveguide and the connection unit are formed, etching is performed under such condition that the roughness of the sidewall is small and the sidewall is vertical as much as possible. In order to simplify the explanation, the following steps are omitted: cleaning, resist coating, mask alignment, exposure, development, formation of mask material used for etching, releasing/removing of resist and mask material, cleaning, and the like.

The first optical wiring layer 202 is formed according to the steps as shown in FIGS. 26A to 29B. First, the first wiring isolating layer 201 is formed on the substrate 200. The first wiring isolating layer 201 is formed with, for example, $SiO_2$ film which is the first clad material.

Figure 27A:
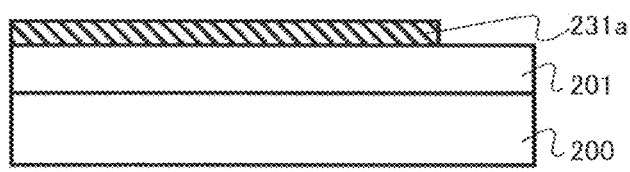
FIGS. 27A and 27B are figures schematically explaining a first manufacturing method of the fourth embodiment.
Figure 27B:
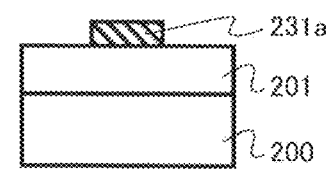

Subsequently, an a-Si film (first core material) 231 is deposited on the first wiring isolating layer 201 by plasma CVD at a deposition temperature of 300 degrees Celsius (FIG. 26). Subsequently, the a-Si film 231 is etched so as to leave only the region 231a which becomes the first optical waveguide 207a (FIGS. 27A and 27B).

Figure 28A:
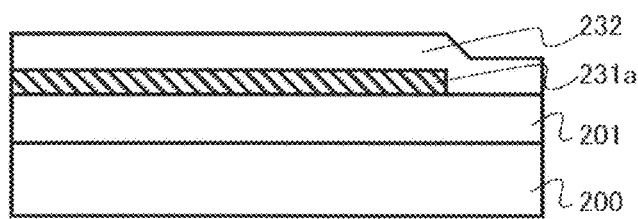
FIGS. 28A and 28B are figures schematically explaining a first manufacturing method of the fourth embodiment.
Figure 28B:
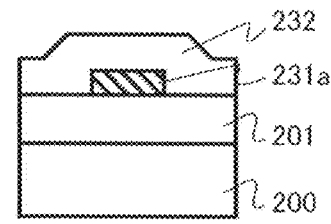
Figure 29A:
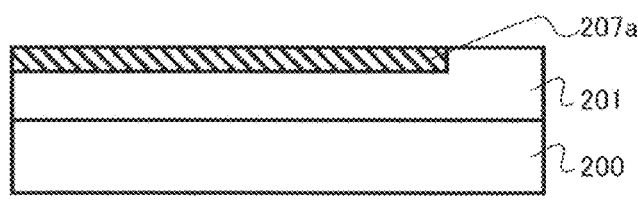
FIGS. 29A and 29B are figures schematically explaining a first manufacturing method of the fourth embodiment.
Figure 29B:
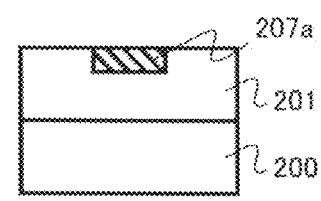

Subsequently, a $SiO_2$ film 232 which becomes the second clad material by plasma CVD on the surface (FIGS. 28A and 28B). Subsequently, the complex structure formed in the steps of FIGS. 26A to 28B is polished/planarized by CMP (FIG. 29). At this occasion, processing is performed so that the surface of the first optical waveguide 207a is exposed.

The steps for manufacturing the first optical wiring layer 202 is the same as the third embodiment except the difference in the material, the layer thickness, and the wiring layer width.

Figure 30A:
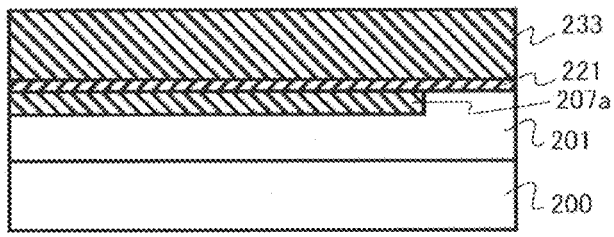
FIGS. 30A and 30B are figures schematically explaining a first manufacturing method of the fourth embodiment.
Figure 30B:
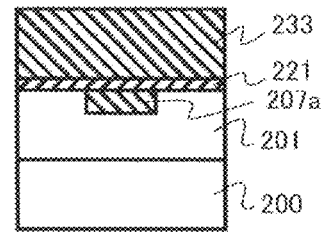

The second wiring isolating layer 203 is formed by the steps as shown in FIGS. 30A to 33B. First, on the first optical wiring layer 202 including the first optical waveguide 207a, a SiN film (first etch stop layer) 221 which has a thickness of 40 nm, which has a refractive index higher than the $SiO_2$ film (first and second clad material), and lower than the a-Si film (first core material) and an a-Si film (second core material) 233 having a thickness of 360 nm are deposited by plasma CVD (FIGS. 30A and 30B).

Figure 31A:
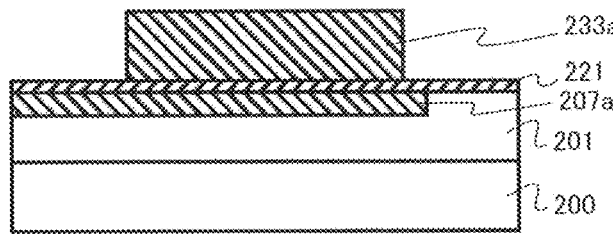
FIGS. 31A and 31B are figures schematically explaining a first manufacturing method of the fourth embodiment.
Figure 31B:
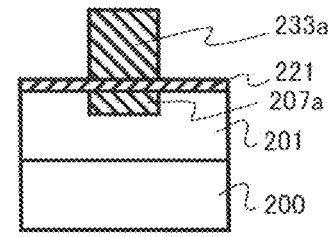

Subsequently, the a-Si film 233 is dry-etched using gas having selectivity (for example, $CF_4/O_2$, $SF_6/CH_4/N_2/O_2$, $SF_6/Cl_2/Ar$, and the like) with respect to SiN, whereby an island-like region 233a which becomes the connection unit 210a is formed. At this occasion, the etching can be stopped at the etching stop layer 221, and therefore, the pattern of the first optical wiring layer is not broken (FIGS. 31A and 31B).

Figure 32A:
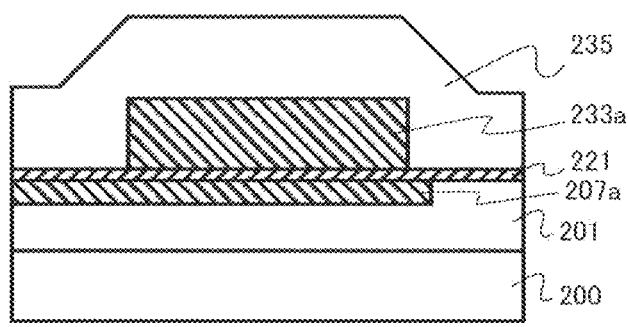
FIGS. 32A and 32B are figures schematically explaining a first manufacturing method of the fourth embodiment.
Figure 32B:
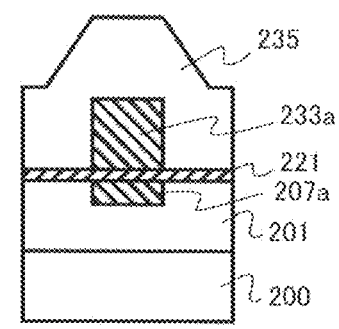

Subsequently, an $SiO_2$ film (third clad material) 235 is deposited so that the island-like region 233a is buried to a predetermined height (FIGS. 32A and 32B).

Figure 33A:
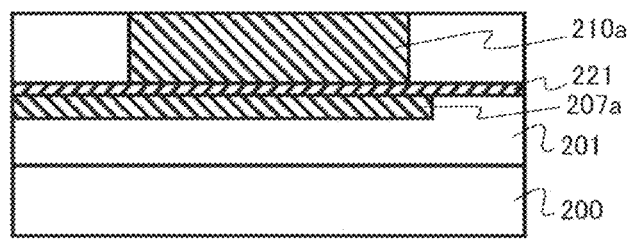
FIGS. 33A and 33B are figures schematically explaining a first manufacturing method of the fourth embodiment.
Figure 33B:
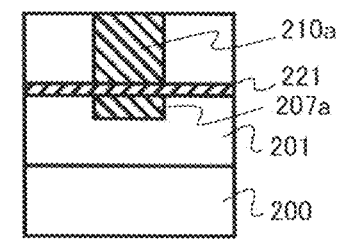
Figure 34A:
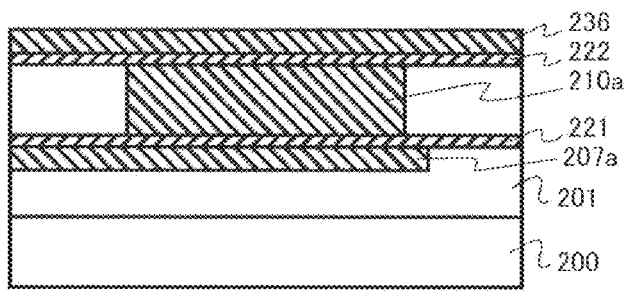
FIGS. 34A and 34B are figures schematically explaining a first manufacturing method of the fourth embodiment.
Figure 34B:
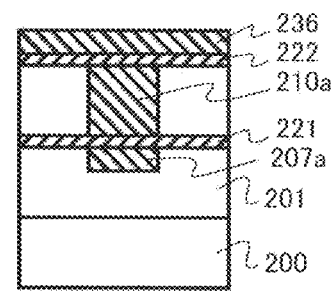

Subsequently, by CMP, the complex structure made in the steps of FIGS. 29A to 31B is polished/planarized to make the thickness 360 nm (FIGS. 33A and 33B). At this occasion, processing is performed so as to expose the surface of the island-like region 233a which becomes the connection unit 210a.

Figure 35A:
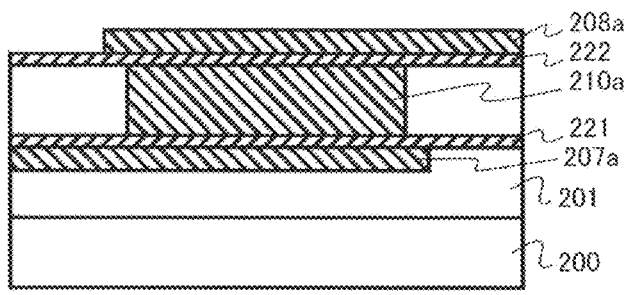
FIGS. 35A and 35B are figures schematically explaining a first manufacturing method of the fourth embodiment.
Figure 35B:
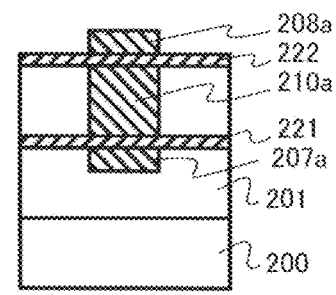

The second optical wiring layer 104 is formed such that the SiN film (second etch stop layer) 222 and the a-Si film (first core material) 236 are deposited (FIGS. 34A and 34B), and the region 236a which becomes the second optical waveguide 208a is formed by etching (FIGS. 35A and 35B). The region 236a which becomes the second optical waveguide 208a is formed in the region including right above the connection unit 210a by stopping etching of the a-Si film (first core material) 236 at the second etch stop layer 222.

Figure 36A:
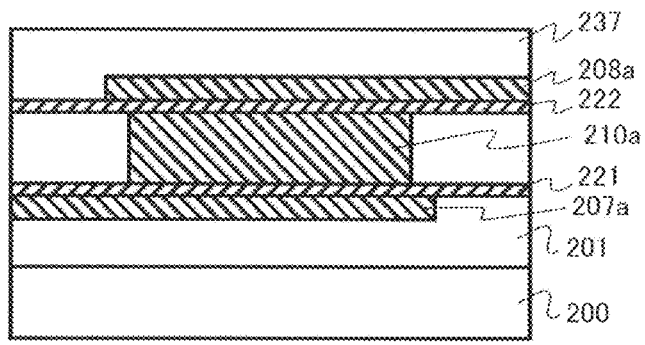
FIGS. 36A and 36B are figures schematically explaining a first manufacturing method of the fourth embodiment.
Figure 36B:
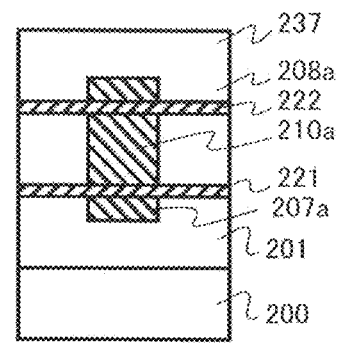

The optical device according to the present embodiment is formed by depositing the $SiO_2$ film (fourth clad material) 237 on the second optical waveguide 208a and performing polishing by CMP (FIGS. 36A and 36B). When only two optical wiring layers are made, the $SiO_2$ film may be deposited thickly, and the last CMP may be omitted, or after the CMP, thick $SiO_2$ film may be deposited again.

When the steps of FIGS. 30A to 36B are repeated after the second optical wiring layer is formed by CMP, three or more multilayer optical wiring layers can be made. In this case, in order to align the characteristics of the respective optical waveguides, it is preferable to insert etching stop layers to the lower side of the lowermost optical wiring layer and the upper side of the uppermost optical wiring layer. Even with two optical wiring layers, symmetrical property in the vertical direction can be improved by sandwiching an etching stop layer between the lower side of the first optical wiring layer and the upper side of the second optical wiring layer.

In the manufacturing method, when the connection unit is formed, the core material is formed first, and processing is performed to etching in a mesa form, and the mesa is buried with the clad material, and planarization is performed. However, like the third embodiment, the clad material may be formed first, and processing may be performed to do etching in a groove form, and the core material may be buried in the groove, and planarization may be performed.

More specifically, a second manufacturing method of the optical device according to the present embodiment includes forming a first clad material on a substrate, forming, on the first clad material, a first optical waveguide made of a first core material having a refractive index higher than the first clad material, forming, on the first optical waveguide, a second clad material having a refractive index lower than the first core material, polishing the second clad material, so that the first optical waveguide is exposed, forming, on the first optical waveguide and the second clad material, a first etch stop layer having a refractive index higher than the first and the second clad materials and made of an etch stop material having a refractive index lower than the first core material, forming, on the first etch stop layer, a third clad material having a refractive index less than the etch stop material, forming a trench having an opening portion right above the first optical waveguide by stopping etching at the first etch stop layer in the third clad material, burying the trench with a second core material having a refractive index higher than the etch stop material, polishing the second core material, and forming a connection unit made of the second core material by exposing the third clad material, forming, on the connection unit and the third clad material, a second etch stop layer made of the etch stop material, forming on the second etch stop layer, a second optical waveguide made of the first core material, right above the connection unit by stopping etching of the first core material at the second etch stop layer, and forming, on the second optical waveguide, a fourth clad material having a refractive index less than the etch stop material.

In the case of the second manufacturing method, etching condition is used so that the etching selectivity of the etching stop layer and the clad material increases.

FIGS. 37A to 40B are figures schematically explaining the second manufacturing method of the present embodiment.

FIG. 37A to FIG. 40A illustrate the MMI cross section parallel to the optical propagation direction, and FIG. 37B to FIG. 40B illustrate the MMI cross section perpendicular to the optical propagation direction in a side by side manner.

The steps up to the formation of the first optical wiring layer 202 are the same as those of the first manufacturing method, and therefore descriptions thereabout are omitted.

Figure 37A:
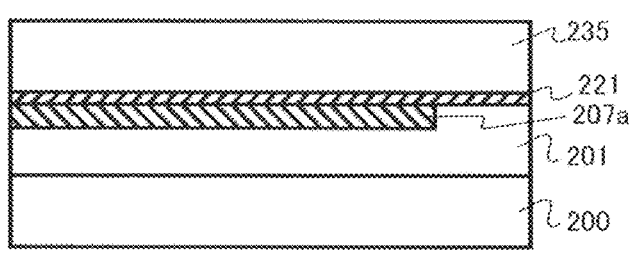
FIGS. 37A and 37B are figures schematically explaining a second manufacturing method of the fourth embodiment.
Figure 37B:
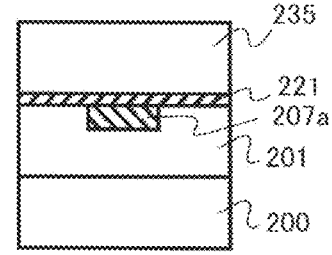

The second wiring isolating layer 203 is formed according to the following steps. First, on the first optical wiring layer 202 including the first optical waveguide 207a, a SiN film (first etch stop layer) 221 which has a thickness of 40 nm, which has a refractive index higher than that of the $SiO_2$ film (first and second clad material) and lower than that of the a-Si film (first core material), and an $SiO_2$ film (third clad material) 235 having a refractive index less than that of the SiN film 221 are deposited by plasma CVD (FIGS. 37A and 37B).

Figure 38A:
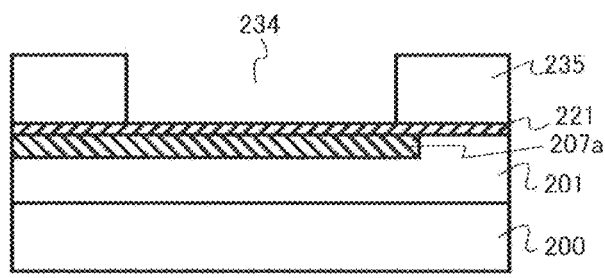
FIGS. 38A and 38B are figures schematically explaining a second manufacturing method of the fourth embodiment.
Figure 38B:
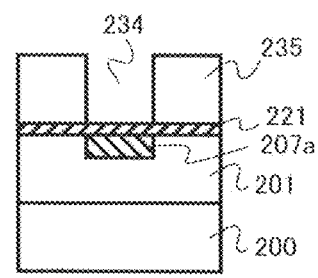

Subsequently, in a portion of the $SiO_2$ film 235 where the connection unit 210a is formed, a trench 234 is formed by stopping etching at the surface of the SiN film 221 (FIGS. 38A and 38B). The trench 234 is positioned right above the first optical waveguide 207a.

Figure 39A:
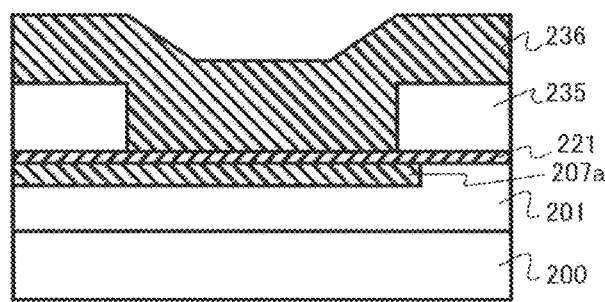
FIGS. 39A and 39B are figures schematically explaining a second manufacturing method of the fourth embodiment.
Figure 39B:
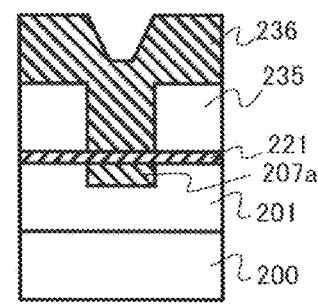

Then, the a-Si film (second core material) 236 having a refractive index higher than that of SiN is deposited by plasma CVD so that the trench 234 is buried to a predetermined height (FIGS. 39A and 39B). Subsequently, by CMP, polishing/planarization is performed, so that the thickness of the second wiring isolating layer 203 becomes 400 nm (FIGS. 40A and 40B).

With the CMP, processing is performed to expose the surface of the third clad material 235. With this step, the connection unit 210a and the surrounding layer 210b are formed.

The step of the formation of the second etch stop layer 222 and the second optical wiring layer 208a are the same as those of the first manufacturing method, and therefore description thereabout is omitted.

In the first to second manufacturing methods of the present embodiment, the process of burying and planarizing the core material in the trench groove of the clad material deposited first can also be employed for the formation of the second optical waveguide 208a. From the perspective of the symmetrical property of the first waveguide 207a and the second waveguide 208a, the first optical waveguide 207a is preferably formed according to the same process as the second optical waveguide 208a. When an etch stop material is inserted between the first optical wiring layer 202 and the first wiring isolating layer 201, the process of burying and planarizing the core material in the groove provided in the clad material can also be employed for the formation of the first optical waveguide 207a. In this case, from the perspective of the symmetrical property of the waveguides, the same etch stop material as the one inserted below the first optical wave guiding layer 207a is preferably inserted above the second optical wave guiding layer 208a.

According to the first and second manufacturing methods of the present embodiment, by applying the first and second etch stop layers, the pattern of the optical wiring layer and the pattern of the wiring isolating layer can be treated independently. More specifically, when the pattern of the optical wiring layer and the pattern of the wiring isolating layer are formed, it is less likely to affect the other pattern in terms of the structure. Therefore, as compared with the third embodiment, the degree of flexibility of design is higher. Except the difference in the thickness, it is possible to manufacture the optical wiring layer and the wiring isolating layer with completely the same material and steps, and therefore, this can avoid complexity of the steps.

When the device length of the MMI optical coupler is long, the light is propagated while being reflected multiple times at the upper and lower boundaries of the MMI optical coupler. For this reason, the offset and the loss due to the deformation of the cross sectional shape are accumulated. In contrast, as illustrated in FIG. 25B, the vertical MMI optical coupler of the present embodiment uses the first interference peak at the side of the output optical waveguide layer of the MMI optical coupler, and therefore, this reduces the influence of the offset to the minimum level. In addition, the size of the device is reduced.

FIGS. 41A to 41F are figures illustrating calculation result of layer offset dependency of coupling efficiency of the vertical MMI optical coupler according to the present embodiment. The calculation is based on FDTD method.

FIGS. 41A to 41E are output waveguide offset dependencies in cases where the connection unit width is 375 nm ($\Delta w_{MMI}$=−50 nm), 400 nm ($\Delta w_{MMI}$=−25 nm), 425 nm ($\Delta w_{MMI}$=0 nm), 450 nm ($\Delta w_{MMI}$=+25 nm), 475 nm ($\Delta w_{MMI}$=+50 nm), respectively. In FIGS. 41A to 41E, the offsets of the connection unit with respect to the input waveguide ($\Delta X_{MMI}$) are 0 nm (solid line), +25 nm (broken line), and +50 nm (alternate long and short dash line).

FIG. 41F is a figure illustrating connection unit width dependency of the coupling efficiency with respect to a typical combination (connection unit horizontal offset amount $\Delta X_{MMI}$ [nm], output waveguide horizontal offset amount $\Delta X_{OUT}$ [m]). When the maximum value of the layer offset amount is ±25 nm, the connection unit width is preferably be 400 nm which is narrower than the waveguide width by 25 nm ($\Delta w_{MMI}$=−25 nm), and the coupling efficiency at this occasion fits within a range of 85.5±0.4%. Even when the alignment error is ±50 nm, the coupling efficiency can be maintained at a level of 83.98% or higher.

FIGS. 42A to 42D are figures illustrating various kinds of parameters dependency of coupling efficiency (or coupling ratio) according to the present embodiment.

Figure 42A:
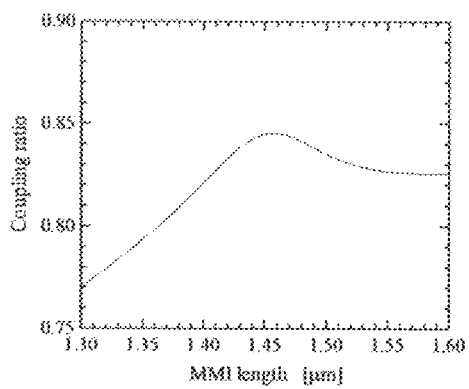
FIGS. 42A to 42D are figures illustrating various kinds of parameters dependency of coupling efficiency according to the fourth embodiment.
Figure 42B:
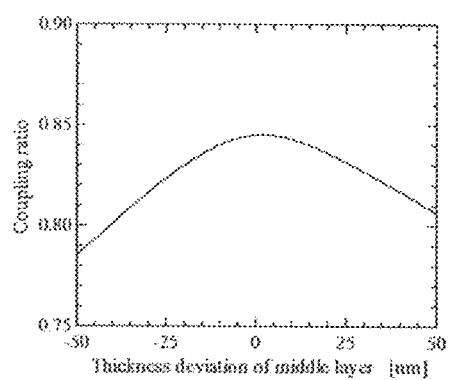

FIG. 42A is a connection unit length dependency of coupling efficiency. FIG. 42B is coupling efficiency where the thickness of the wiring isolating layer 203 is deviated from the predetermined value (360 nm). In any case, the calculation results where the connection unit width is 425 nm and there is no offset are shown.

Figure 42C:
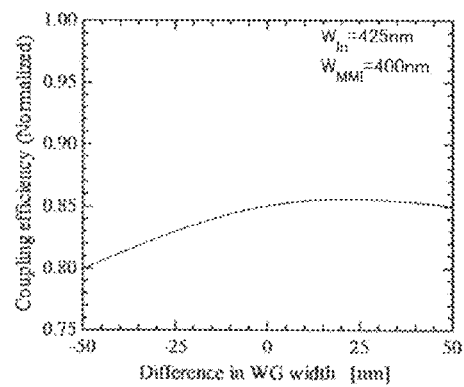

FIG. 42C is coupling efficiency where the output waveguide width is deviated from a predetermined value (425 nm). This shows a calculation result in a case where the connection unit width is 400 nm and there is no offset. It is found that the vertical MMI optical coupler of the present embodiment has a relatively high tolerance with respect to the deviation of various dimensions of the constituent elements.

Figure 42D:
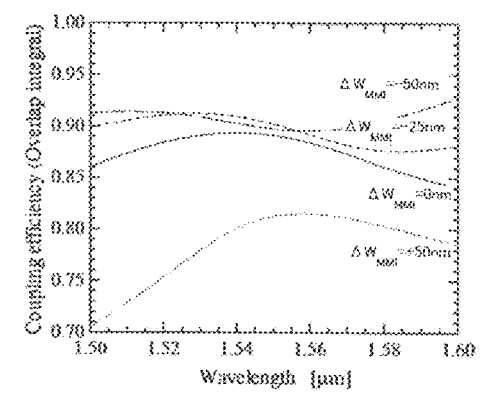

FIG. 42D is wavelength dependency of coupling efficiency. The following cases are shown: the difference between the connection unit width and the optical waveguide width is −50 nm (alternate long and short dash line), −25 nm (broken line), 0 nm (solid line), +50 nm (dotted line). When the connection unit width is somewhat narrowed as compared with the optical waveguide width, the wavelength dependency of the coupling efficiency can be reduced.

It is known that when a two-dimensional slab waveguide which is uniform in the thickness direction is assumed, the effective refractive index of $TE_i$ mode (i=0, 1, . . . is the number of nodes) of MMI multi-mode waveguide can be approximated by formula (III) when Goos-Hanchen shift is disregarded.

$$n_i \approx n_{core} - \frac{(i+1)^2 \lambda^2}{8 n_{core} W^2} \quad \text{Formula (III)}$$

In this case, $n_{core}$ the refractive index of the core material, and W is the width of MMI. Although approximation is somewhat deteriorated, formula (III) can also be applied to flat surface (horizontal) MMI having the three-dimensional structure of which upper and lower sides are sandwiched by the clad material. The vertical MMI of the present embodiment is in a vertical state perpendicular to the substrate by rotating the horizontal MMI 90 degrees, and therefore, W corresponds to the total thickness H of the core layers of the multi-mode waveguide unit. In order to distinguish the widths of the connection unit and the waveguide, H is used instead of W in the following discussion about the vertical MMI.

The vertical MMI optical coupler of the present embodiment has three modes, that is, i=0, 1, 2. The coupling length (the propagation distance at which the peak caused by interference in the mode i=0 and the mode i=1 is made at the output optical guide) can be approximated as formula (IV).

$$L_0 = \frac{\lambda}{2\Delta n_{01}} \approx \frac{4 n_{core} H^2}{3\lambda} \quad \text{Formula (IV)}$$

When the design values of the vertical MMI optical coupler of the present embodiment (average refractive index of the core weighted with the thickness $n_{core}$=3.31, H=0.76 μm, λ=1.55 μm) are substituted, $L_0$ becomes 1.64 μm, which is estimated to be larger by about 13% than the actual connection unit length (1.45 μm). As described above, the connection unit length L where the first interference peak appears at the output plane side can be approximated by the value on the right hand side of the formula (IV), and when the length is doubled, the peak due to the interference of the mode i=0 and the mode i=1 returns back to the incidence waveguide plane side.

Therefore, the connection unit length L of the vertical MMI using the first interference peak on the output plane side is less than 1.5 times of the value on the right hand side of the formula (IV) at least. More specifically, the vertical MMI optical coupler using the first interference peak at the output layer side must satisfy at least formula (I), $$L < \frac{2 n_{core} H^2}{\lambda} \quad \text{Formula (I)}$$

wherein the total thickness of the core layers from the lower surface of the first optical waveguide to the upper surface of the second optical waveguide in the region where the connection unit exists is H, the average refractive index of the core layer weighted with the thickness is $n_{core}$, and the wavelength of the light is λ.

However, sufficiently large coupling efficiency is not necessarily obtained when the formula (I) is satisfied, and appropriate design is required. For example, in the case of the vertical MMI optical coupler of the third embodiment, the coupling efficiency where the first interference peak is used is only 70%. Self-image method used for designing a conventional horizontal MMI cannot be applied to design of the vertical MMI optical coupler of the embodiment, but it is waste of time to effortlessly calculate FDTD without any design plan. The inventor made use of the fact that the number of modes interfering in the MMI unit (in the core layer) is small, that is, only three (the modes with nodes in the width direction and the mode of which polarization is different are excluded), and has found that it is possible to determine whether the design is good or not from the effective refractive index of the interference mode.

The effective refractive indexes of three interference modes in the MMI are denoted as $n_0$, $n_1$, $n_2$, which are arranged in the descending order of the effective refractive index. The mode 0 and the mode 2 are symmetrical mode (the electric fields of the incidence side waveguide plane and the output side waveguide plane are the same), and the mode 1 is asymmetrical mode (the sign of the electric field of the incidence side waveguide plane and the sign of the electric field of the output side waveguide plane are opposite to each other). The peak of the output plane side increases when the phases of the two symmetrical modes are the same and the phase of the asymmetrical mode is different from the symmetrical mode by π, and more specifically, when, among the modes, the relationship of formula (V) is satisfied between the difference $\Delta n_{01}$ of the effective refractive indexes in the mode in which the effective refractive index is the largest and the mode in which the effective refractive index is the second largest and the difference $\Delta n_{12}$ of the effective refractive indexes in the mode in which the effective refractive index is the second largest and the mode in which the effective refractive index is the lowest.

$$\Delta n_{01}(\equiv n_0 - n_1) = \Delta n_{12}(\equiv n_1 - n_2) = \frac{\lambda}{2 L_0} \quad \text{Formula (V)}$$

Wherein λ is the wavelength, $L_0$ is the coupling length. At the position of the odd number times $L_0$, the maximum peak appears on the output plane side, and at the position of the even number times $L_0$, the maximum peak appears on the incidence plane side. In particular, when the ratio of square of the electric field intensities of the three modes in the output waveguide plane is 1:4:1, the component remaining in the input waveguide plane at the output can be minimized.

When the approximation formula (III) is used, $\Delta n_{12}$ equals to $(5/3)\Delta n_{01}$, and therefore, the condition of the formula (V) is not satisfied. The effective refractive index of the actual three-dimensional MMI mode is deviated from the value of the formula (III), but $\Delta n_{01} \leq \Delta n_{12}$ holds unless a particular refractive index distribution in the thickness direction is given. However, it was found that coupling efficiency of about 80% is achieved when deviation from the value of the formula (V) of $\Delta n_{01}$ and $\Delta n_{12}$ is reduced to 15% or less.

More specifically, the vertical optical coupler of the present embodiment is designed so that the length L of the wiring layer connection unit satisfies formula (II).

$$0.425 \frac{\lambda}{L} \leq \Delta n_{01}, \Delta n_{12} \leq 0.575 \frac{\lambda}{L} \quad \text{Formula (II)}$$

When wavelength λ=1.55 μm, and MMI length L=1.45 μm are substituted, the conditions of the formula (II) are 0.454<$\Delta n_{01}$, $\Delta n_{12}$<0.615. The effective refractive indexes of the interference modes of the vertical MMI optical coupler of the present embodiment are $n_0$=2.795, $n_1$=2.325, and $n_2$=1.729. $\Delta n_{01}$=0.470, $\Delta n_{12}$=0.596 satisfy the condition of the formula (II).

In the vertical MMI optical coupler of the present embodiment, the SiN layers 221, 222 having refractive indexes lower than a-Si is configured to be inserted to a-Si which is the main core material, but the insertion position is relatively close to the peak of the mode 1, and corresponds to the node of the mode 2. For this reason, the effective refractive index of the mode 1 is relatively low, and the difference between $\Delta n_{01}$ and $\Delta n_{12}$ is small.

Due to the effect of the SiN slab layers 221, 222, the propagation mode of the input optical waveguide is in an asymmetrical shape in which the peak is deviated to the second wiring isolating layer, and it affects the coupling ratio to the three modes interfering each other in the MMI unit. The ratio of square of the electric field intensities of the three modes in the output waveguide plane of the present embodiment is closer to 1:3:2 rather than 1:4:1, but nonetheless, coupling efficiency of 80% or higher is obtained.

The method for satisfying the condition of the formula (II) is not limited to the method of the present embodiment. For example, when the refractive index distribution of the connection unit in the thickness direction are configured such that the refractive index is higher in the central portion in a stepwise manner or continuously, the effective refractive indexes of the mode 0 and the mode 2 having the peak in the central portion can be increased with respect to the change in the effective refractive index of the mode 1, and therefore, the difference of $\Delta n_{01}$ and $\Delta n_{12}$ can be reduced. Although the manufacturing process is complicated, the structure can be optimized to attain a condition more close to the condition of the formula (V) and to make the ratio of square of the electric field intensities of the modes at the output position more close to 1:4:1, whereby the vertical MMI optical coupler can be achieved with still lower degree of loss.

The coupling efficiency of the vertical MMI optical coupler of the third and fourth embodiments is not as good as that of the directional coupler that is fabricated in accordance with the design, but the vertical MMI optical coupler of the third and fourth embodiments has much larger tolerance against the deviation of the size during manufacturing, particularly against the difference in size of the upper and lower optical waveguides, as compared with the directional coupler. The coupling efficiency of the vertical MMI optical coupler of the third and fourth embodiments has sufficiently large tolerance against not only the deviation of the size, but also deviation of the refractive index and the composition between the first optical waveguide and the second optical waveguide or between the first etch stop layer and the second etch stop layer, for example. The size can be significantly reduced as compared with the directional coupler, and therefore, integration density can be increased effectively.

The embodiments of the present disclosure have been hereinabove explained with reference to specific examples. The above embodiments are shown merely as examples, and are not intended to limit the present disclosure. In the explanation about the embodiments, descriptions about portions of the optical device and the like that are not directly needed in the explanation about the present disclosure are omitted in the explanation about the embodiments. However, necessary elements related to the optical device and the like can be selected and used as necessary.

For example, in the third, fourth embodiments, even when the material, the dimension of the waveguide, the distance between the optical wiring layers, the wavelength, the polarization, and the like are different, the material (refractive index) and the size of each portion may be set on the basis of the plan, whereby the optical wiring layer connection can be achieved in a small size with a high degree of tolerance against the deviation of the position.

In the third, fourth embodiments, when there are three or more optical wiring layers, multiple stages of vertical MMI optical couplers of the embodiments may be connected to achieve connection of multiple layers. When the plane 1×2 MMI optical coupler and the 2×2 MMI optical coupler are combined with the 1×1 vertical MMI optical coupler of the present disclosure, optical wiring layer connection such as 1×2, 2×2, and the like can be achieved.

While certain embodiments have been described, these embodiments have been presented by way of example only, and are not intended to limit the scope of the inventions. Indeed, optical device and manufacturing method thereof described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An optical device comprising:
   a laser light source;
   a first optical waveguide propagating light, the light being output from the laser light source;
   a first distribution device distributing the light into n lights (n is an integer equal to or more than two), the light being input from the first optical waveguide;
   n second optical waveguides propagating the n lights, the n lights being output from the first distribution device;
   n second distribution devices distributing the n lights being propagated through the n second optical waveguides, each of the n second distribution devices distributing light propagated through each of the n second optical waveguides into m lights (m is an integer equal to or more than two);
   n×m third optical waveguides propagating n×m lights, the n×m lights being output from the n second distribution devices;
   a plurality of control electrodes applying voltage or current to each of the n×m third optical waveguides individually, and control phase of each of light propagating through the n×m third optical waveguides individually; and
   an output end surface outputting n×m lights, the n×m lights being propagated through the n×m third optical waveguides.

2. The device according to claim 1, wherein the laser light source is a laser diode.

3. The device according to claim 1, wherein the first and second distribution devices are a multi-mode interference waveguides.

4. The device according to claim 1, wherein the first, second, and third optical waveguides are made of silicon.

5. The device according to claim 1, further comprising a clad layer existing around the first, second, and third optical waveguides, the clad layer having refractive index less than those of the first, second, and third optical waveguides.

6. The device according to claim 1 further comprising a phase control circuit controlling a voltage or current applied to the control electrode,
   wherein the phase control circuit is formed with an integrated circuit on a semiconductor substrate,
   the laser light source, first, second, and third optical waveguides, the first and second distribution devices, the control electrode, and the output end surface are formed on the semiconductor substrate.

* * * * *